(12) United States Patent
Iijima et al.

(10) Patent No.: US 7,857,919 B2
(45) Date of Patent: *Dec. 28, 2010

(54) PROCESS FOR PRODUCING STEEL PRODUCT AND PRODUCTION FACILITY THEREFOR

(75) Inventors: Yoshitsugu Iijima, Kawasaki (JP);
Hiroshi Mizuno, Kawasaki (JP);
Hiroshi Sekine, Fukuyama (JP);
Noritsugu Suzuki, Kawasaki (JP);
Masatoshi Sugioka, Fukuyama (JP)

(73) Assignee: JFE Steel Corporation, Tokyo (JP)

( * ) Notice: Subject to any disclaimer, the term of this patent is extended or adjusted under 35 U.S.C. 154(b) by 525 days.

This patent is subject to a terminal disclaimer.

(21) Appl. No.: 10/524,128

(22) PCT Filed: Aug. 5, 2003

(86) PCT No.: PCT/JP03/09959

§ 371 (c)(1),
(2), (4) Date: Mar. 11, 2005

(87) PCT Pub. No.: WO2005/012580

PCT Pub. Date: Feb. 10, 2005

(65) Prior Publication Data

US 2005/0252587 A1    Nov. 17, 2005

(30) Foreign Application Priority Data

Jun. 16, 2003    (JP)    ............... 2003-171083

(51) Int. Cl.
*C21D 1/10* (2006.01)
(52) U.S. Cl. .................................... 148/567
(58) Field of Classification Search ............ 148/567
See application file for complete search history.

(56) References Cited

U.S. PATENT DOCUMENTS 4,307,276 A    12/1981    Kurata et al.
4,484,048 A    11/1984    Travers et al.
6,891,139 B2 *   5/2005    Iijima et al. .............. 219/667

FOREIGN PATENT DOCUMENTS

| EP | 1 359 230 A1 | 11/2003 |
|---|---|---|
| EP | 1 496 129 A1 | 1/2005 |
| JP | 48-25239 | 4/1973 |
| JP | 62-238328 A | 10/1987 |
| JP | 4-358022 A | 12/1992 |
| JP | 6-254615 A | 9/1994 |
| JP | 9-256053 A | 9/1997 |

* cited by examiner

*Primary Examiner*—Roy King
*Assistant Examiner*—Jie Yang
(74) *Attorney, Agent, or Firm*—RatnerPrestia

(57) ABSTRACT

The present invention provides a method of manufacturing a steel product, comprising the step of heat treating a steel product having been subjected to quenching or accelerated cooling on a hot rolling line after hot rolling to pass the steel product through a plurality of induction heating apparatuses, which are installed on the hot rolling line, three times or more. The method of the present invention makes it possible to uniformly heat treat the steel product with high productivity.

25 Claims, 14 Drawing Sheets

FIG. 4

NUMBER OF TIMES OF PASSAGE WITH PRIORITY IN TREATMENT TIME
(IN CASE OF THREE INDUCTION HEATING APPARATUSES)

THICKNESS 15mm

| LENGTH | INITIAL TEMPERATURE | 550°C | 575°C | 600°C | 620°C | 650°C |
|---|---|---|---|---|---|---|
| 15m | 200°C | 1 | 3 | 3 | 3 | 3 |
| 15m | 300°C | 3 | 1 | 3 | 3 | 3 |
| 15m | 400°C | 1 | 1 | 3 | 3 | 3 |
| 25m | 200°C | 1 | 3 | 3 | 3 | 3 |
| 25m | 300°C | 1 | 1 | 3 | 3 | 3 |
| 25m | 400°C | 1 | 1 | 3 | 3 | 3 |
| 35m | 200°C | 1 | 3 | 3 | 3 | 3 |
| 35m | 300°C | 1 | 1 | 1 | 3 | 3 |
| 35m | 400°C | 1 | 1 | 3 | 3 | 3 |

THICKNESS 20mm

| LENGTH | INITIAL TEMPERATURE | 550°C | 575°C | 600°C | 620°C | 650°C |
|---|---|---|---|---|---|---|
| 15m | 200°C | 3 | 3 | 3 | 3 | 3 |
| 15m | 300°C | 1 | 3 | 3 | 3 | 3 |
| 15m | 400°C | 1 | 3 | 3 | 3 | 3 |
| 25m | 200°C | 3 | 3 | 3 | 3 | 3 |
| 25m | 300°C | 1 | 3 | 3 | 3 | 3 |
| 25m | 400°C | 3 | 3 | 3 | 3 | 3 |
| 35m | 200°C | 3 | 3 | 3 | 3 | 3 |
| 35m | 300°C | 1 | 3 | 3 | 3 | 3 |
| 35m | 400°C | 3 | 3 | 3 | 3 | 3 |

THICKNESS 25mm

| LENGTH | INITIAL TEMPERATURE | 550°C | 575°C | 600°C | 620°C | 650°C |
|---|---|---|---|---|---|---|
| 15m | 200°C | 3 | 3 | 3 | 3 | 5 |
| 15m | 300°C | 3 | 3 | 3 | 3 | 5 |
| 15m | 400°C | 3 | 3 | 3 | 3 | 5 |
| 25m | 200°C | 3 | 3 | 3 | 3 | X |
| 25m | 300°C | 3 | 3 | 3 | 5 | X |
| 25m | 400°C | 3 | — | 3 | 5 | X |
| 35m | 200°C | — | — | — | — | — |
| 35m | 300°C | — | — | — | — | — |
| 35m | 400°C | — | — | — | — | — |

THICKNESS 30mm

| LENGTH | INITIAL TEMPERATURE | 550°C | 575°C | 600°C | 620°C | 650°C |
|---|---|---|---|---|---|---|
| 15m | 200°C | 3 | 3 | 3 | 3 | X |
| 15m | 300°C | 3 | 3 | 3 | 3 | X |
| 15m | 400°C | 3 | 3 | 3 | 3 | X |
| 25m | 200°C | 3 | 3 | 5 | 5 | X |
| 25m | 300°C | 3 | 5 | 5 | 5 | X |
| 25m | 400°C | 3 | — | 5 | 5 | X |
| 35m | 200°C | — | — | — | — | — |
| 35m | 300°C | — | — | — | — | — |
| 35m | 400°C | — | — | — | — | — |

THICKNESS 35mm

| LENGTH | INITIAL TEMPERATURE | 550°C | 575°C | 600°C | 620°C | 650°C |
|---|---|---|---|---|---|---|
| 15m | 200°C | 3 | 3 | 3 | 3 | X |
| 15m | 300°C | 3 | 3 | 3 | 3 | X |
| 15m | 400°C | 3 | 3 | 3 | 3 | X |
| 25m | 200°C | 3 | 3 | 5 | 5 | X |
| 25m | 300°C | 3 | 5 | 5 | 5 | — |
| 25m | 400°C | — | — | — | — | — |
| 35m | 200°C | — | — | — | — | — |
| 35m | 300°C | — | — | — | — | — |
| 35m | 400°C | — | — | — | — | — |

THICKNESS 40mm

| LENGTH | INITIAL TEMPERATURE | 550°C | 575°C | 600°C | 620°C | 650°C |
|---|---|---|---|---|---|---|
| 15m | 200°C | 3 | 3 | 3 | — | — |
| 15m | 300°C | 3 | 3 | 5 | — | — |
| 15m | 400°C | 3 | 3 | 5 | — | — |
| 25m | 200°C | 3 | 5 | 5 | — | — |
| 25m | 300°C | 3 | 5 | 5 | — | — |
| 25m | 400°C | 3 | 5 | 5 | — | — |
| 35m | 200°C | — | — | — | — | — |
| 35m | 300°C | — | — | — | — | — |
| 35m | 400°C | — | — | — | — | — |

X : UNABLE TO HEAT    — : NO CORRESPONDING MATERIAL

FIG. 5

NUMBER OF TIMES OF PASSAGE WITH PRIORITY IN ELECTRIC POWER CONSUMPTION RATE
(IN CASE OF THREE INDUCTION HEATING APPARATUSES)

| THICKNESS | 15mm | | | | | | |
|---|---|---|---|---|---|---|---|
| LENGTH | INITIAL TEMPERATURE | \multicolumn{6}{c}{TARGET TEMPERATURE} |
| | | 550°C | 575°C | 600°C | 620°C | 650°C |
| 15m | 200°C | 1 | 1 | 1 | 1 | 3 |
| | 300°C | 1 | 1 | 1 | 3 | 3 |
| | 400°C | 1 | 1 | 1 | 3 | 3 |
| 25m | 200°C | 1 | 1 | 1 | 1 | 3 |
| | 300°C | 1 | 1 | 1 | 1 | 3 |
| | 400°C | 1 | 1 | 1 | 1 | 3 |
| 35m | 200°C | 1 | 1 | 1 | 1 | 3 |
| | 300°C | 1 | 1 | 1 | 1 | 3 |
| | 400°C | 1 | 1 | 1 | 1 | 3 |

| THICKNESS | 20mm | | | | | | |
|---|---|---|---|---|---|---|---|
| LENGTH | INITIAL TEMPERATURE | 550°C | 575°C | 600°C | 620°C | 650°C |
| 15m | 200°C | 1 | 1 | 1 | 1 | 3 |
| | 300°C | 1 | 1 | 1 | 3 | 3 |
| | 400°C | 1 | 1 | 1 | 3 | 3 |
| 25m | 200°C | 1 | 1 | 1 | 1 | 3 |
| | 300°C | 1 | 1 | 1 | 3 | 3 |
| | 400°C | 1 | 1 | 1 | 1 | 3 |
| 35m | 200°C | 1 | 1 | 1 | 1 | 3 |
| | 300°C | 1 | 1 | 1 | 3 | 3 |
| | 400°C | 1 | 1 | 1 | 1 | 3 |

| THICKNESS | 25mm | | | | | | |
|---|---|---|---|---|---|---|---|
| LENGTH | INITIAL TEMPERATURE | 550°C | 575°C | 600°C | 620°C | 650°C |
| 15m | 200°C | 1 | 1 | 3 | 3 | 3 |
| | 300°C | 1 | 1 | 3 | 3 | 3 |
| | 400°C | 1 | 1 | 3 | 3 | 3 |
| 25m | 200°C | — | — | 3 | 3 | × |
| | 300°C | — | — | 3 | 3 | × |
| | 400°C | — | — | 3 | 3 | × |
| 35m | 200°C | — | — | — | — | — |
| | 300°C | — | — | — | — | — |
| | 400°C | — | — | — | — | — |

| THICKNESS | 30mm | | | | | | |
|---|---|---|---|---|---|---|---|
| LENGTH | INITIAL TEMPERATURE | 550°C | 575°C | 600°C | 620°C | 650°C |
| 15m | 200°C | 3 | 3 | 3 | 3 | × |
| | 300°C | 3 | 3 | 3 | 3 | × |
| | 400°C | 3 | 3 | 3 | 3 | × |
| 25m | 200°C | 3 | 3 | 3 | 5 | × |
| | 300°C | — | 3 | 3 | 5 | × |
| | 400°C | — | — | — | — | — |
| 35m | 200°C | — | — | — | — | — |
| | 300°C | — | — | — | — | — |
| | 400°C | — | — | — | — | — |

| THICKNESS | 35mm | | | | | | |
|---|---|---|---|---|---|---|---|
| LENGTH | INITIAL TEMPERATURE | 550°C | 575°C | 600°C | 620°C | 650°C |
| 15m | 200°C | 3 | 3 | 3 | 3 | × |
| | 300°C | 3 | 3 | 3 | 3 | × |
| | 400°C | 3 | 3 | 3 | 3 | × |
| 25m | 200°C | 3 | 3 | 3 | 5 | × |
| | 300°C | — | 5 | 5 | 5 | × |
| | 400°C | — | — | — | — | — |
| 35m | 200°C | — | — | — | — | — |
| | 300°C | — | — | — | — | — |
| | 400°C | — | — | — | — | — |

| THICKNESS | 40mm | | | | | | |
|---|---|---|---|---|---|---|---|
| LENGTH | INITIAL TEMPERATURE | 550°C | 575°C | 600°C | 620°C | 650°C |
| 15m | 200°C | 3 | 3 | 3 | — | — |
| | 300°C | 3 | 3 | 3 | — | — |
| | 400°C | 3 | 3 | 3 | — | — |
| 25m | 200°C | 3 | 3 | 5 | — | — |
| | 300°C | 3 | 3 | 5 | — | — |
| | 400°C | — | — | 5 | — | — |
| 35m | 200°C | — | — | — | — | — |
| | 300°C | — | — | — | — | — |
| | 400°C | — | — | — | — | — |

×: UNABLE TO HEAT   —: NO CORRESPONDING MATERIAL

PROCESS FOR PRODUCING STEEL PRODUCT AND PRODUCTION FACILITY THEREFOR

This application is the United States national phase application of International Application PCT/JP2003/009959 filed Aug. 5, 2003.

TECHNICAL FIELD

The present invention relates to a method for manufacturing a steel product, in which the steel product having been subjected to quenching or accelerated cooling after hot rolling is subjected to on-line heat-treatment, in particular, to a method for manufacturing a steel product using a plurality of induction heating apparatuses, and manufacturing facilities therefor.

BACKGROUND ART

In many cases, steel plates having a thickness of 8 mm or more are rapidly cooled by quenching or accelerated cooling after hot rolling and then subjected to tempering treatment in order to achieve high strength and toughness.

In recent years, while the quenching or the accelerated cooling is carried out in an on-line manner, the tempering treatment is carried out in a gas combustion furnace as usual in an off-line manner, so that it takes time to considerably decrease the productivity of steel plate. Therefore, several methods have been proposed to increase the productivity in the tempering treatment process.

To increase the productivity, for example, JP-A-9-256053 proposes a new heating pattern of tempering treatment. In this heating pattern, the steel plate is continuously transferred in a gas combustion furnace, which is set to high temperature at the inlet side thereof, and to low temperature at the outlet side thereof, to be subjected to heat treatment. To be concrete, the temperature at the inlet side of the furnace is set to be higher by at least 200° C. than the target heat treatment temperature so that the furnace temperature is decreased stepwise toward the outlet side of the furnace, and the temperature at the outlet side of the furnace is set to be within ±20° C. from the target heat treatment temperature. In a heating system by gas combustion, however, the heat transfer is conducted through radiation and convection, so that the rapid heating is impossible and the productivity can not be adequately increased.

JP-A-4-358022 and JP-A-6-254615 propose, as a heat treatment method for increasing the productivity, an on-line heat treatment method, in which a heating apparatus is installed on a rolling line to heat the steel plate. The former discloses a method for manufacturing a steel plate having high strength and toughness, in which a rolling mill, an accelerated cooling apparatus, and a heating apparatus are arranged on a rolling line to perform rapid heating in tempering treatment, and the latter discloses a method, in which a rolling mill, a leveler, an accelerated cooling apparatus, and a"heat keeping furnace are arranged on a rolling line so that the residual stress in steel plate, generated by rolling and accelerated cooling, is removed in the heat keeping furnace. However, these methods cause problems that it takes time for heat treatment and that the steel plate can not be uniformly subjected to heat treatment.

JP-A-48-25239 discloses a method for heat treating a steel plate, in which a plurality of solenoid type induction heating apparatuses are arranged in series on a rolling line. When the steel plate is heated to the target temperature with a single induction heating apparatus, the induced current is localized in the vicinity of the steel plate surface, thus sometimes causing a problem that the surface thereof is excessively heated to over the Curie point or the Ac1 transformation point. Therefore, since it is difficult to heat the thickness-wise center of steel plate to the target temperature with a single induction heating apparatus during controlling the surface temperature of steel plate to or below a certain temperature, JP-A-48-25239 arranges two or more induction heating apparatuses in series, and passes a steel plate through these apparatuses so that the surface temperature of the steel sheet does not exceed the upper limit temperature and the thickness-wise center temperature reaches the target temperature. For that purpose, however, it is necessary to decrease the transfer speed of steel plate, so that it is not possible to attain the adequately high productivity. In particular, in case of the steel plate having a large thickness, it takes time for heating the thickness-wise center of the steel plate, and therefore the transfer speed has to be decreased to a large extent, so that the productivity is remarkably decreased.

DISCLOSURE OF THE INVENTION

It is an object of the present invention to provide a method for manufacturing a steel product, in which the steel product can be uniformly subjected to heat treatment with high productivity using induction heating apparatuses arranged on a hot rolling line, and manufacturing facilities therefor.

The above object is attained by the following methods.

1) A method of manufacturing a steel product, comprising the step of heat treating a steel product having been subjected to quenching or accelerated cooling on a hot rolling line after hot rolling by passing the steel product through a plurality of induction heating apparatuses, which are installed on the hot rolling line, three times or more. Here, one time of passage means that the steel product passes through a plurality of induction heating apparatuses once in one direction. Accordingly, when the steel product goes and comes back through the induction heating apparatuses once, the number of times of passage amounts to two.

2) A method of manufacturing a steel product, comprising the step of heat treating a steel product having been subjected to quenching or accelerated cooling on a hot rolling line after hot rolling by passing the steel product through a plurality of induction heating apparatuses, which are installed on the hot rolling line, at least once, and wherein the number of times of passage through the induction heating apparatuses is such a number of times that the surface temperature and the thickness-wise center temperature of the steel product fall in a predetermined temperature range in the shortest time.

3) A method of manufacturing a steel product, comprising the step of heat treating a steel product having been subjected to quenching or accelerated cooling on a hot rolling line after hot rolling by passing the steel product through a plurality of induction heating apparatuses, which are installed on the hot rolling line, at least once, and wherein the number of times of passage through the induction heating apparatuses is such a number of times that the surface temperature and the thickness-wise center temperature of the steel product fall in a predetermined temperature range within a target treatment time.

4) A method of manufacturing a steel product, comprising the step of heat treating a steel product having been subjected to quenching or accelerated cooling on a hot rolling line after hot rolling by passing the steel product through a plurality of induction heating apparatuses, which are installed on the hot rolling line, at least once, and wherein the steel product is subjected to heat treatment so that heat treatment time, which is calculated on the basis of the dimensions and the necessary temperature rise of the steel product, the number of times of passage through the induction heating apparatuses, and the heating capacities of the induction heating apparatuses, and which elapses until the surface temperature of the steel product does not exceed a predetermined upper limit temperature and the temperature in a predetermined position inside the steel product reaches a target temperature, falls within a target treatment time.

5) A method of manufacturing a steel product, comprising the step of heat treating a steel product having been subjected to quenching or accelerated cooling on a hot rolling line after hot rolling by passing the steel product through a plurality of induction heating apparatuses, which are installed on the hot rolling line, at least once, and wherein the steel product is subjected to heat treatment so that heat treatment time, which is calculated on the basis of the dimensions and the necessary temperature rise of the steel product, the number of times of passage through the induction heating apparatuses, and the heating capacities of the induction heating apparatuses, and which elapses until the surface temperature of the steel product does not exceed a predetermined upper limit temperature and the temperature in a predetermined position inside the steel product reaches a target temperature, becomes the shortest.

6) A method of manufacturing a steel product, comprising the step of heat treating a steel product having been subjected to quenching or accelerated cooling on a hot rolling line after hot rolling by passing the steel product through two to five induction heating apparatuses, which are installed on the hot rolling line, three times or more.

These methods can be realized by manufacturing facilities of steel product comprising, on a hot rolling line, a hot rolling mill, a quenching or accelerated cooling apparatus, a plurality of induction heating apparatuses, and an operating unit for heat treatment pattern of the induction heating apparatuses, and wherein the operating unit comprises means to calculate scheduled time, at which a steel product having been subjected to quenching or accelerated cooling after hot rolling reaches the induction heating apparatuses, and means to determine a heat treatment pattern, which prevents a succeeding steel product to be subjected to heat treatment from waiting on the hot rolling line, from the dimensions and the necessary temperature rise of the steel product, and scheduled time, at which the succeeding steel product reaches the induction heating apparatuses.

BRIEF DESCRIPTION OF THE DRAWINGS

FIG. 4 is a number of times of passage preferable for heat treatment time.

FIG. 5 is a number of times of passage preferable for electric power consumption rate.

EMBODIMENTS OF THE INVENTION

Figure 1:
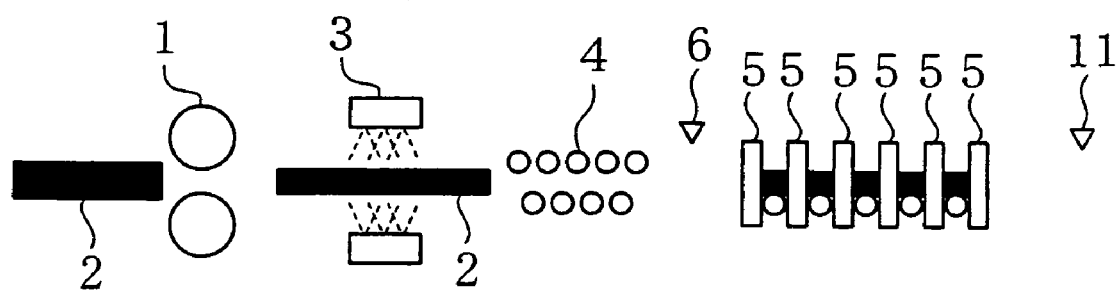
FIG. 1 is an example of manufacturing facilities of steel product according to the present invention.

FIG. 1 shows an example of manufacturing facilities of steel product according to the present invention.

The steel product 2 rolled by a hot rolling mill 1 is subjected to quenching by a water cooling apparatus 3, corrected in shape by a leveler 4, and then subjected to heat treatment by a plurality of induction heating apparatuses 5. As the induction heating apparatuses 5, transverse type ones or solenoid type ones are applicable. However, the solenoid type ones are preferable in view of controlling the temperature in the vicinity of the surface of the steel product 2. In addition, the leveler 4 is not necessarily arranged after the water cooling apparatus 3 but may be arranged upstream of the water cooling apparatus 3 or downstream of the induction heating apparatuses 5 while it is desired that the leveler 4 be arranged at the inlet side of the induction heating apparatuses 5 in view of uniformly heating the steel product 2 and preventing the collision between the steel product 2 and the induction heating apparatuses 5.

Figure 2:
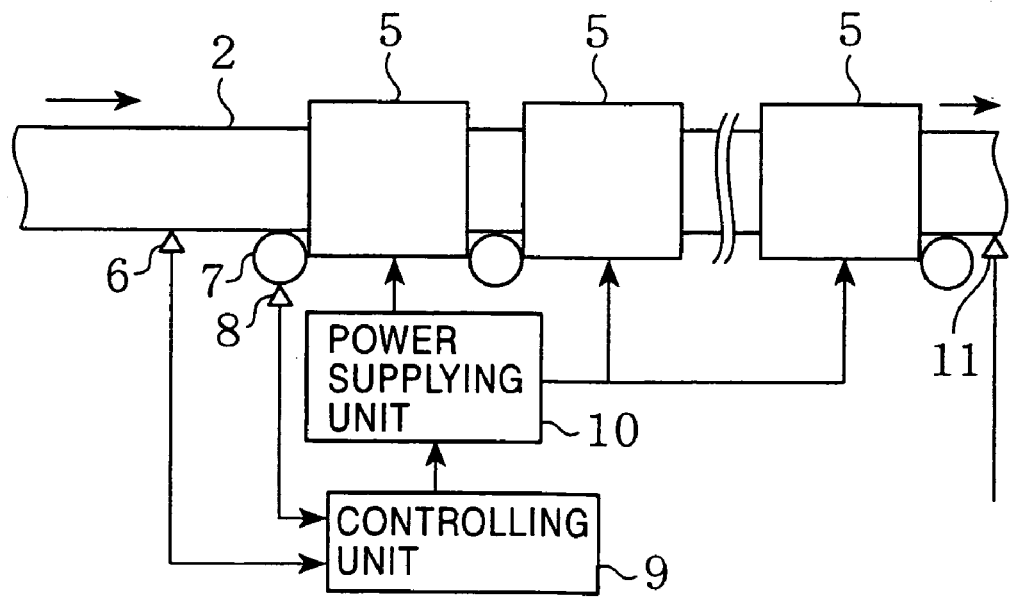
FIG. 2 is a detail of the induction heating apparatus shown in FIG. 1.

FIG. 2 shows a detail of the induction heating apparatuses shown in FIG. 1.

The induction heating apparatus comprise a plurality of induction heating apparatuses 5, a temperature sensor 6 provided at the inlet of the first induction heating apparatus 5 to detect the temperature of the steel product 2, transfer rollers 7 for transferring the steel product 2, a speed sensor 8 to detect the transfer speed of the steel product on the basis of rotation of the transfer rollers 7, a controlling unit 9 to calculate the electric power supplied to each induction heating apparatus 5, a power supplying unit 10 to control the electric power supplied to each induction heating apparatus 5 on the basis of the output from the controlling unit 9, and a temperature sensor 11 provided at the outlet of the last induction heating apparatus 5 to detect the temperature of the steel product 2 after heating.

Embodiments of a method of manufacturing a steel product using the above-described induction heating apparatuses, according to the present invention, will be described below.

First Embodiment

A steel product is subjected to so-called reverse heating, in which the steel product goes and comes back through the induction heating apparatuses three times or more. Since increasing the number of times of passage corresponds apparently to increasing the number of induction heating apparatuses, the temperature rise every induction heating apparatus can be reduced. The transfer speed of steel product can, therefore, be increased as compared with the case where the number of times of passage is set to one. Also, in the case where the reverse heating is carried out three times, for example, the steel product may be heated only at the first and the last times without heating at the second time. In this case, since the transfer speed can be increased at the second time to shorten the heat treatment time; it is possible to enhance the productivity.

Second Embodiment

A steel product is subjected to heat treatment in such a number of times of passage that both the surface temperature and the thickness-wise center temperature fall in a predetermined temperature range in the shortest time.

Third Embodiment

A steel product is subjected to heat treatment by setting a number of times of passage through the induction heating apparatuses to that number of times of passage, in which the heat treatment time, determined by the relationship established between the number of times of passage, the transfer speed of the steel product and the electric power of the induction heating apparatuses using the dimensions and the necessary temperature rise of the steel product, becomes the shortest.

Namely, the steel product is subjected to heat treatment in such a number of times of passage that the heat treatment time, in which the surface temperature and the thickness-wise center temperature of the steel product determined using the number of times of passage, the transfer speed of the steel product and the electric power of the induction heating apparatuses fall within a predetermined temperature range, becomes the shortest.

The procedure of determining the number of times of passage, the transfer speed of the steel product each time, and the electric power of each respective induction heating apparatus conceivably includes the following two methods, that is, (1) a method of determining the transfer speed, the number of times of passage, and the electric power every steel product, and (2) a method of predetermining the number of times of passage, the transfer speed, and the electric power according to the dimensions of the steel product.

(1) The method of determining the transfer speed, the number of times of passage, and the electric power of the induction heating apparatuses every steel product

[1] The dimensions and the necessary temperature rise of the steel product are acquired.

The thickness and the width of the steel product being subsequently subjected to heat treatment, and the conditions of target temperature, the upper limit temperature, etc. are acquired from a computer, which controls the production.

[2] The transfer speed and the electric power are found in the case where the number of times of passage is one.

Assuming that the heat treatment is carried out once, the optimization problem is solved, in which the variables include the transfer speed of the steel product and the electric power of each induction heating apparatus, the constraint conditions include the upper limit temperature and the target temperature, and the objective function includes the heat treatment time and the amount of consumed electricity. In this case, the problem can be solved using the optimization technique such as linear programming, non-linear programming, or the like, and can be also solved by suitably changing the respective variables to find that the combination of the transfer speed and the electric power, in which the heat treatment time becomes the shortest and the power consumption becomes the lowest.

[3] The transfer speed and the electric power are found in the case where the number of times of passage is three.

Assuming that the heat treatment is carried out three times, the optimization problem is solved, in which the variables include the transfer speed of the steel product each time and the electric power of each induction heating apparatus, the constraint conditions include the upper limit temperature and the target temperature, and the objective function includes the heat treatment time and the amount of consumed electricity. In this case, the problem can be solved using the optimization technique such as linear programming, non-linear programming, or the like, and can be also solved by suitably changing the respective variables to find that the combination of the transfer speed and the electric power, in which heat the treatment time becomes the shortest and the power consumption becomes the lowest.

[4] The transfer speed and the electric power are found in the case where the number of times of passage is more than Increasing the number of times of passage to five, seven, and so on in the same manner as in [3], the combination of the transfer speed and the electric power each time is found. The maximum number of times of passage is predetermined according to the dimensions and the temperature rise of the steel product, and the processing in [4] is performed until the predetermined number of times is reached.

[5] The number of times of passage is determined.

Selecting the number of times of passage, in which the heat treatment time becomes the shortest, the steel product is subjected to heat treatment by using the transfer speed and the electric power at that time.

(2) The method of predetermining the number of times of passage, the transfer speed, and the electric power of the induction heating apparatuses according to the dimensions of the steel product.

A table as shown in TABLE 1 and including the number of times of passage and the transfer speed according to the dimension of the steel product, is beforehand prepared every steel type and every heat treatment pattern.

A table is prepared with respect to the conditions of heat treatment, for example, the following two conditions of heat treatment, that is, respective conditions of the initial temperature prior to the heat treatment, the target temperature, and the temperature rise being a difference therebetween. TABLE 1 is an example prepared on the basis of the conditions of heat treatment a).

a) Initial temperature: 400° C., target temperature: 600° C., temperature rise: 200° C.

b) Initial temperature: 100° C., target temperature: 600° C., temperature rise: 500° C.

TABLE 1 is prepared in the following processes [1] to [5].

[1] The dimensions and the necessary temperature rise of the steel product to be subjected to heat treatment are determined.

[2] The transfer speed and the electric power of each induction heating apparatus in the case where the number of times of passage is one are found.

Assuming that the heat treatment is carried out once, the optimization problem is solved, in which the variables include the transfer speed of the steel product and the electric power of each induction heating apparatus, the constraint conditions include the upper limit temperature and the target temperature, and the objective function includes the heat treatment time and the amount of consumed electricity. In this case, the problem can be solved using the optimization technique such as linear programming, non-linear programming, or the like, and can be also solved by suitably changing the respective variables to find that the combination with electric power, in which the power consumption is minimized.

[3] The transfer speed of the steel product and the electric power of each induction heating apparatus in the case where the number of times of passage is three are found.

Assuming that the heat treatment is carried out three times, the optimization problem is solved, in which the variable is the electric power of each induction heating apparatus, the constraint conditions include the upper limit temperature and the target temperature, and the objective function includes the amount of consumed electricity. In this case, the problem can be solved using the optimization technique such as linear programming, non-linear programming, or the like, and can be also solved by suitably changing the respective variables to find that the combination with the electric power, in which the power consumption is minimized.

[4] The transfer speed of the steel product and the electric power of each induction heating apparatus in the case where the number of times of passage is more than three are found.

Increasing the number of times of passage to five, seven and so on in the same manner as in [3], the combination of the transfer speed and the electric power each time is found. The maximum number of times of passage is predetermined according to the dimensions and the temperature rise of the steel product, and the processing in [4] is performed until the predetermined number of times is reached.

[5] The number of times of passage is determined.

The number of times of passage, in which the heat treatment time becomes the shortest, and the transfer speed of steel product are determined. Though not shown in TABLE 1, the electric power at that time is also obtained.

When the heat treatment is actually carried out, the number of times of passage and the transfer speed given in TABLE 1 are selected according to the steel type, the conditions of the heat treatment, and the dimensions of the steel product.

At that time, the actual initial temperature is measured, and when it is different from the assumed initial temperature, the electric power is corrected based thereon.

passage. Since the temperature of the steel product is raised by the first heat treatment, it is possible to increase the transfer speed at the second passage and the third passage, so that the heat treatment time can be shortened and the power consumption can be reduced as compared with the case where the heat treatment is carried out at the same transfer speed for all the passages.

Sixth Embodiment

First, the basic concept of this embodiment will be described in the following.

To heat treat the steel product having been subjected to quenching or accelerated cooling after hot rolling by passing the steel product through the induction heating apparatus arranged on a hot rolling line, there seems be two methods. One is to carry out a heat treatment in which the number of times of passage is one and the number of induction heating apparatus is plural, and the other is to carry out a reverse heating in which the number of induction heating apparatus is one, the number of times of passage is plural, and the steel product goes and comes back through the induction heating apparatus.

The heat treatment time was compared between the following cases (A) to (C), in which the steel product having a thickness of 25 mm, a length of 25 mm, and a width of 3.5 m was subjected to heat treatment with restrictions of the starting heat temperature being 450 r, the surface upper limit temperature being 710° C., and the target temperature being 650° C.

TABLE 1

| | WIDTH (mm) | | | | | | | | | | | |
|---|---|---|---|---|---|---|---|---|---|---|---|---|
| | 1000 | | | | 2000 | | | | 3000 | | | |
| THICKNESS (mm) | NUMBER OF TIMES OF PASSAGE | SPEED 1 | SPEED 2 | SPEED 3 | NUMBER OF TIMES OF PASSAGE | SPEED 1 | SPEED 2 | SPEED 3 | NUMBER OF TIMES OF PASSAGE | SPEED 1 | SPEED 2 | SPEED 3 |
| 10 | 1 | 60 | | | 1 | 40 | | | 1 | 20 | | |
| 20 | 1 | 40 | | | 1 | 20 | | | 3 | 30 | 40 | 40 |
| 30 | 1 | 20 | | | 3 | 30 | 40 | 40 | 3 | 20 | 30 | 30 |

SPEED 1, 2 and 3: transfer speed (m/min)

Fourth Embodiment

In the case where the reverse heating is to be carried out with the number of times of passage being three or more, the transfer speed of the steel product is changed every time. As described in the third embodiment, the changing of the transfer speed every time is effective in order to meet the temperature restrictions and to minimize the heat treatment time and the power consumption.

Fifth Embodiment

In the case where the reverse heating is to be carried out with the number of times of passage being n not less than three, the heat treatment time is shortened by making the transfer speed of the steel product in the nth passage and the (n-1)th passage larger than the transfer speed of the steel product prior to the (n-2)th passage.

In case of carrying out the heat treatment in, for example, three times, the transfer speed of the steel product is set to the transfer speed of the first passage<that of the second passage and the transfer speed of the first passage<that of the third (A) Number of induction heating apparatus: 6, number of times of passage: 1

(B) Number of induction heating apparatus: 3, number of times of passage: 1

(C) Number of induction heating apparatus: 3, number of times of passage: 3

The optimum transfer speed of the steel product and the electric power of the induction heating apparatus, which met the above temperature restrictions, were calculated for the respective three cases. The following result was obtained.

Figure 3A:
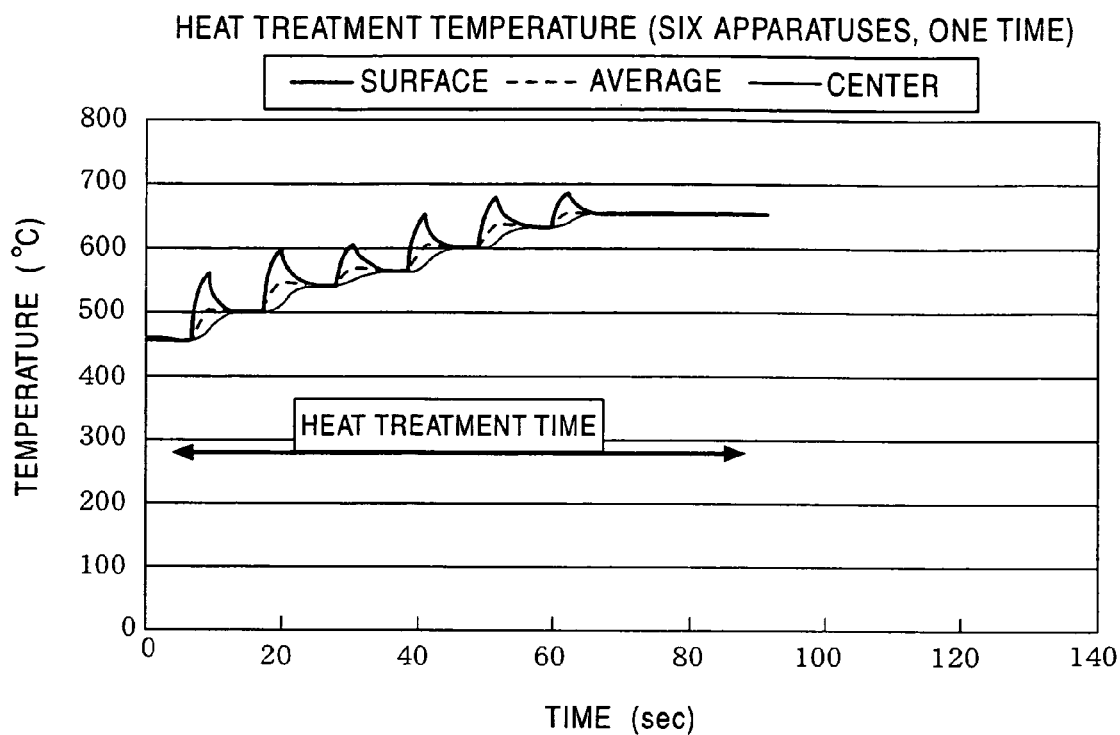
FIGS. 3A to 3C are different heat treatment patterns depending on the number of induction heating apparatus and the number of times of passage.
Figure 3B:
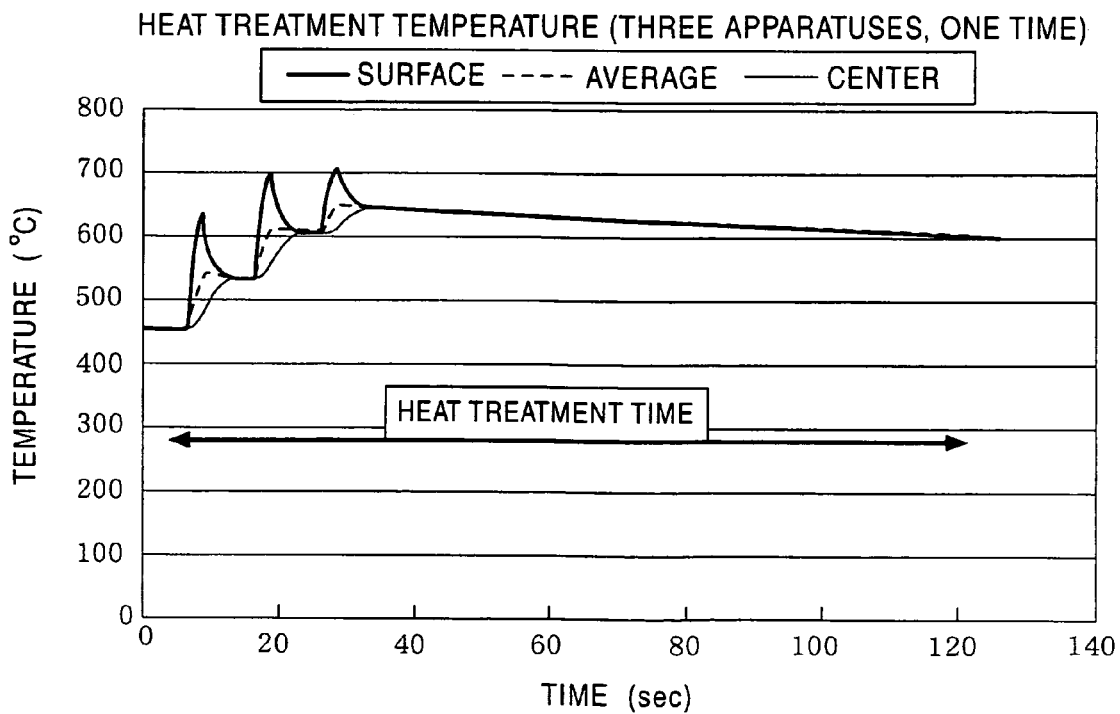
Figure 3C:
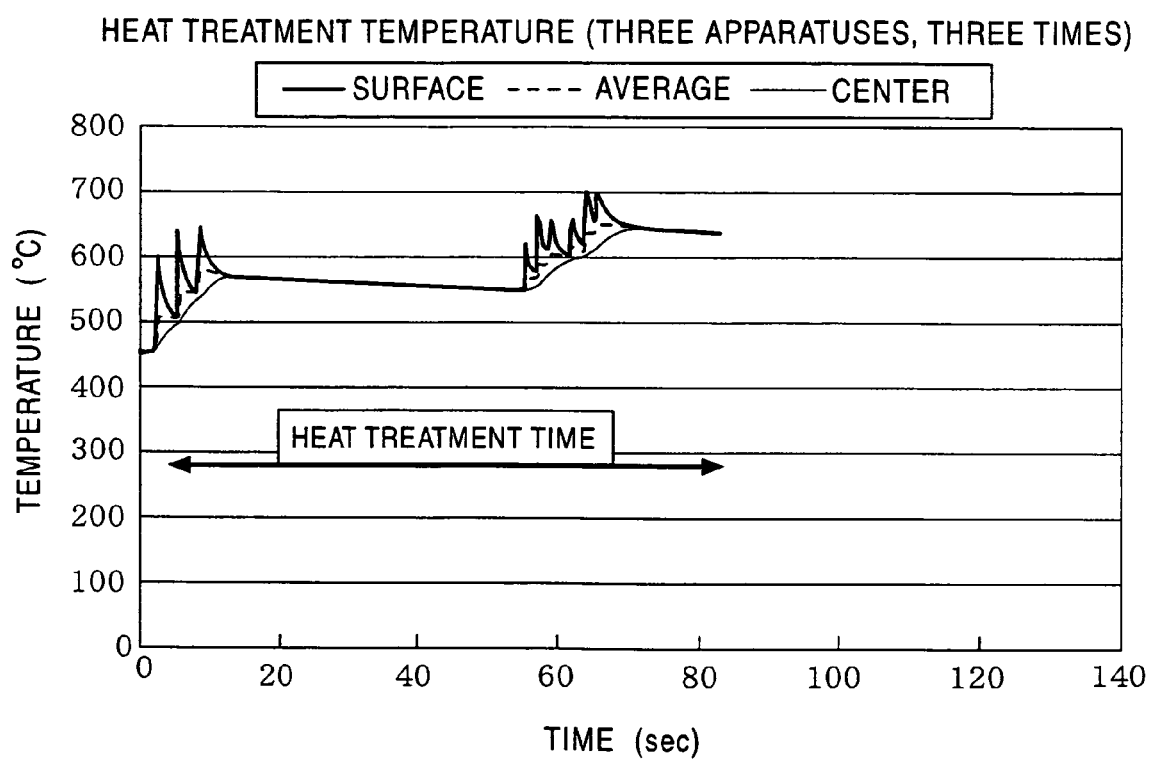

(A) Transfer speed: 55 m/min, electric power consumption rate: 56.6 kWh/ton (B) Transfer speed: 15 m/min, electric power consumption rate: 50.8 kWh/ton (C) Transfer speed: 50 m/min at the first passage, 120 m/min at the second passage, 120 m/min at the third passage, electric power consumption rate: 55.6 kWh/ton FIG. 3 shows heat treatment patterns for the surface temperature, the thickness-wise center temperature, and the average temperature of the steel product under the above conditions. FIG. 3A shows results in the case (A), FIG. 3B shows results in the case (B), and FIG. 3C shows results in the case (C). Here, the temperature is measured at the top end of the steel product. Also, the period of time, in which the surface temperature rises and falls in a short time (around 5 seconds) to form a peak, corresponds to the period, in which the top end of steel product passes through the induction heating apparatuses. Six peaks appear in the case of six induction heating apparatuses and one time of passage in FIG. 3A, three peaks appear in the case of three induction heating apparatuses and one time of passage in FIG. 3B, and three peaks appear three times in the case of three induction heating apparatuses and three times of passage in FIG. 3C. The reason why there is a large time interval between three peaks indicative of the first passage and three peaks indicative of the second passage is that the temperature of the leading end of the steel product is measured as described above and a long period of time lapses until the trailing end of the steel product goes out from the first passage and then the leading end of the steel product goes in the second passage. In addition, the surface temperature is controlled so that its peak value does not exceed the Curie point and the Ac1 transformation point, allowing the steel product to have desired properties, for example, hardness and toughness.

In comparison among FIGS. 3A to 3C, the reason why the heat treatment time amounts to 120 seconds in FIG. 3B, longer than the heat treatment time of 90 seconds in FIG. 3A is that the number of induction heating apparatus is small and therefore the transfer speed of the steel product is obliged to decrease for heat treatment under the same temperature conditions.

Also, although the number of induction heating apparatus is three in FIG. 3C, by making the number of times of passage three, the heat treatment time amounts to 80 seconds, shorter than that of six induction heating apparatuses and one time of passage in FIG. 3A. This is because the transfer speed of the steel product is constant with the number of times of passage being one while the heat treatment in case of three times of passage can be carried out in a short time by changing the transfer speed in conformity to the heat treatment. Also, the electric power consumption rate becomes smaller than in the case where six induction heating apparatuses are used.

From the above, it is found that as compared with the case where the heat treatment is carried out in one time of passage with many induction heating apparatuses being installed, the heat treatment time is shorter and the consumption of electric energy is smaller when the reverse heating is carried out in several times of passage with a suitable number of induction heating apparatuses being installed. Besides, it is possible to reduce the number of induction heating apparatus, which are very expensive. In the above example, using three induction heating apparatuses in place of six induction heating apparatuses can reduce the cost to ½ to ⅔. Further, a space necessary for installation is small.

In addition, though not shown here, in the case where the number of induction heating apparatus is two and the number of times of passages is plural, it is possible to considerably reduce the installation cost and space although the heat treatment time increases somewhat.

In the case where the heat treatment is carried out in plural times of passages with four or five induction heating apparatuses, the installation cost and space increase a little but it is possible to considerably shorten the heat treatment time.

The reverse heating in plural times of passage is not necessarily applied to all the types of steel product but may be applied to the case where the heat treatment time is shortened in plural times of passages and the case where the electric power consumption rate is reduced. For example, three times and five times of passage are effective in the case where much electric power is needed because of the large dimension of the steel product and the large temperature rise. Accordingly, one time of passage is in some cases advantageous in the case where the dimension and the temperature rise of the steel product are small. In many cases, plural times of passage are advantageous. For example, FIG. 4 shows the number of times of passage to make the heat treatment time advantageous according to the dimension and the temperature rise of the steel product when the number of induction heating apparatus is three, and FIG. 5 shows the number of times of passage to make the electric power consumption rate advantageous. However, it is possible to confirm that one time of passage is in some cases advantageous.

The number of times of passage in the respective embodiments described above may be not only odd but also even.

Subsequently, an explanation will be given to embodiments of manufacturing facilities of steel product according to the present invention.

Figure 6:
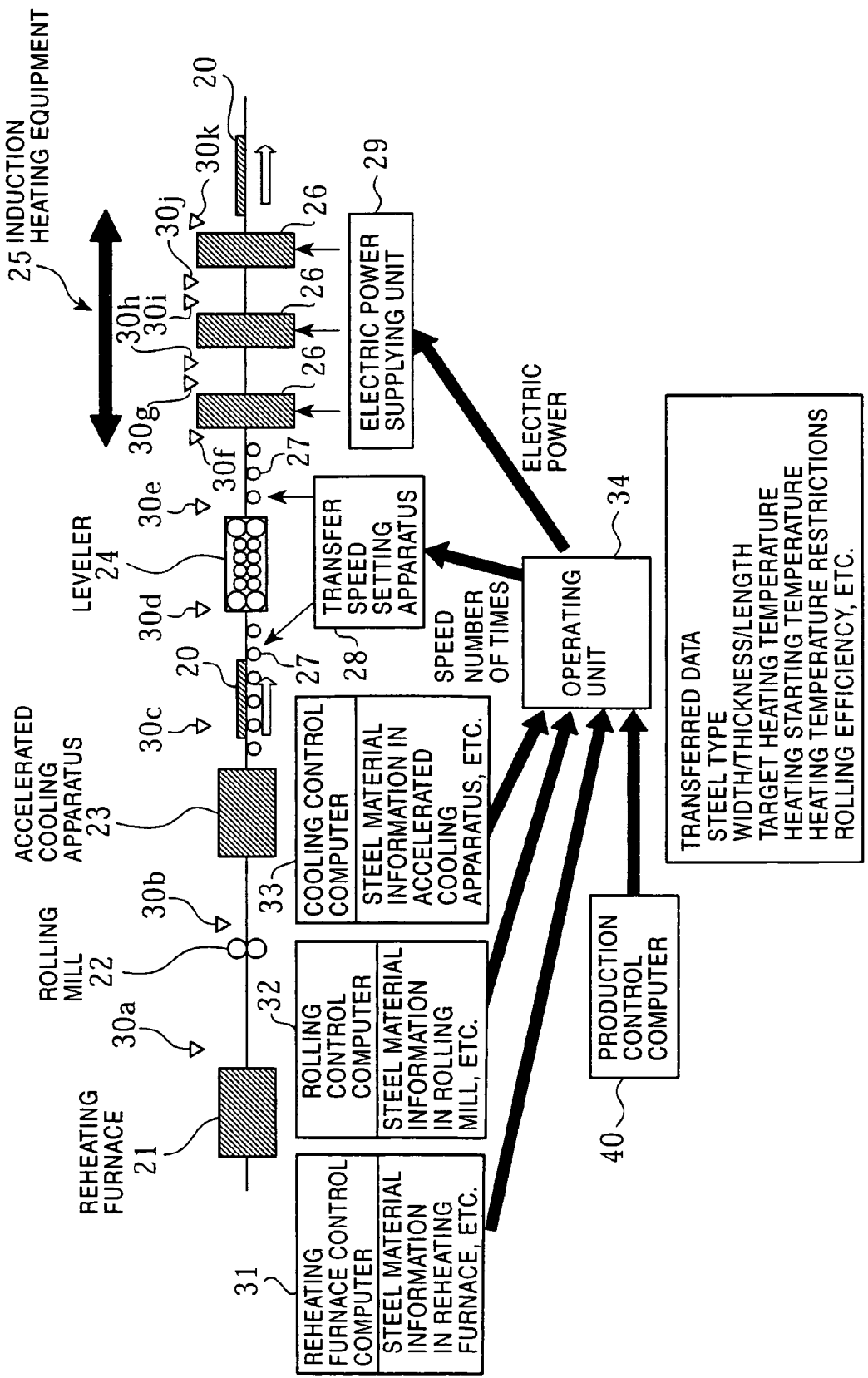
FIG. 6 is another example of manufacturing facilities of steel product according to the present invention.

FIG. 6 shows another example of manufacturing facilities of steel product according to the present invention.

The manufacturing facilities comprises, on a hot rolling line, a reheating furnace 21, a rolling mill 22, an accelerated cooling apparatus 23, a leveler 24, and an induction heating equipment 25 composed of a plurality (here, three) of induction heating apparatuses 26. Also, there are attached a transfer speed setting apparatus 28 to set the speed of transfer rollers 27 for transferring the steel product 20, an electric power supplying apparatus 29 to supply the electric power to the respective induction heating apparatus 26, a reheating furnace control computer 31 to control the reheating furnace 21, a rolling control computer 32 to control the rolling mill 22, a cooling control computer 33 to control the accelerated cooling apparatus 23, an operating unit 34 to control the induction heating equipment 25, and a production control computer 40 to perform the whole production control. Further, a thermometer 30*a* is mounted at the outlet side of the reheating furnace 21, a thermometer 30*b* is mounted at the outlet side of the rolling mill 22, a thermometer 30*c* is mounted at the outlet side of the cooling apparatus 23, thermometers 30*d* and 30*e* are mounted at the inlet and outlet sides of the leveler 24, and thermometers 30*f* to 30*k* are mounted at the inlet and outlet sides of the induction heating equipment 25 of each induction heating apparatus 26.

In the manufacturing facilities, the steel product 20 is heated in the reheating furnace 21, then rolled by the rolling mill 22, and thereafter subjected to accelerated cooling in the accelerated cooling apparatus 23. Thereafter, the steel product 20 is corrected in shape by the leveler 24, and then subjected to heat treatment by the induction heating apparatus 26.

At this time, the reheating furnace control computer 31, the rolling control computer 32, and the cooling control computer 33 track the location of the steel product 20, and the tracking data are input into the operating unit 34. The operating unit 34 performs a predetermined operation to determine the number of times of passages and the transfer speed of the steel product in the induction heating equipment 25 and the electric power for heating, of which results are output to the transfer speed setting apparatus 28 and the electric power supplying apparatus 29 to control the induction heating equipment 25.

Details of the reheating furnace control computer 31, the rolling control computer 32, the cooling control computer 33, and the operating unit 34 will be described as follows with reference to FIGS. 7 to 10.

Figure 7:
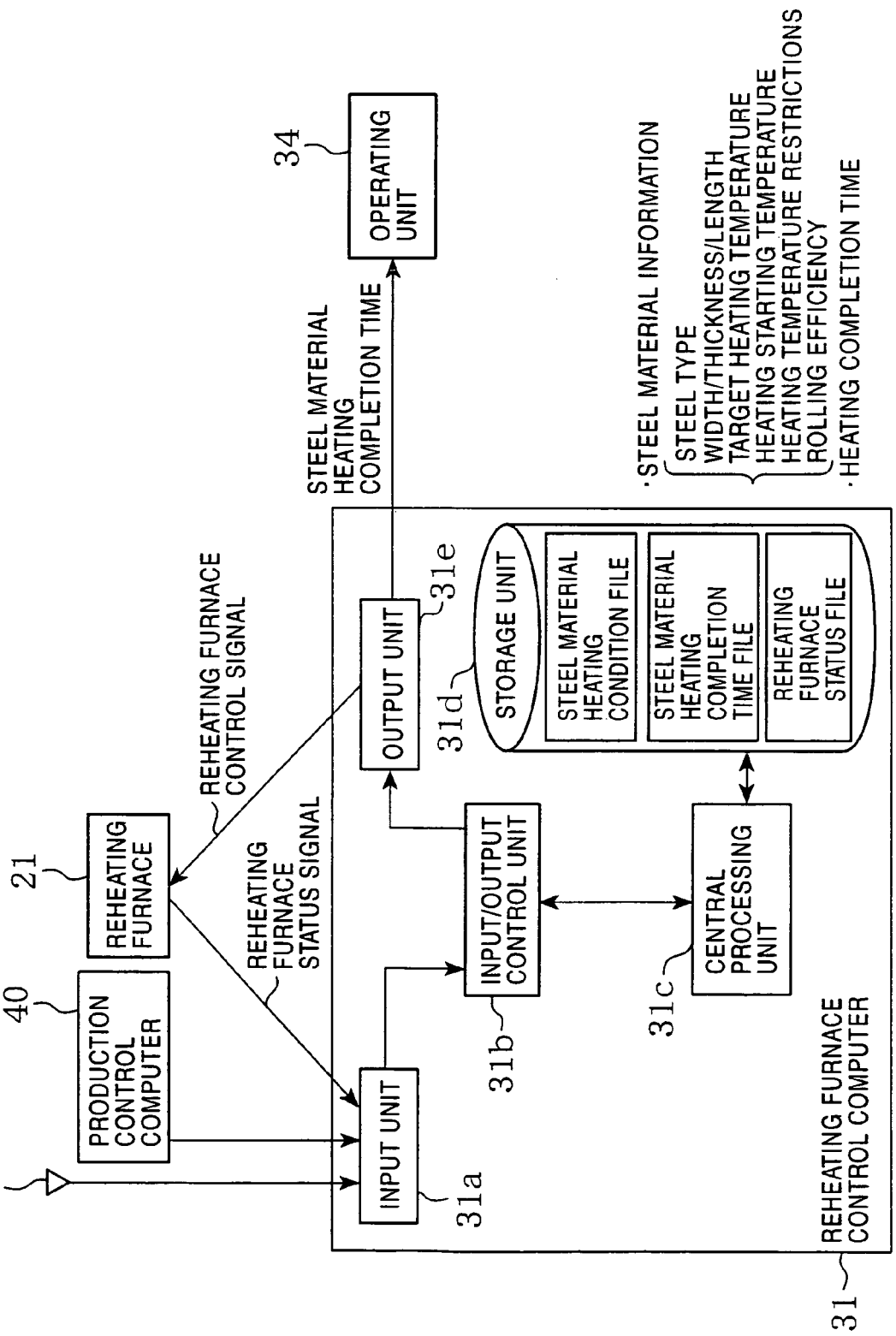
FIG. 7 is a detail of the reheating furnace control computer shown in FIG. 6.

FIG. 7 shows a detail of the reheating furnace control computer 31 to control the reheating furnace 21.

The reheating furnace control computer 31 comprises an input unit 31a, an input/output control unit 31b, a central processing unit 31c, a storage unit 31d, and an output unit 31e. In addition, the storage unit 31d may comprise any one of stationary magnetic disk, floppy disk, and memory. This is the same with regard to storage units of the other computers described later.

Figure 8:
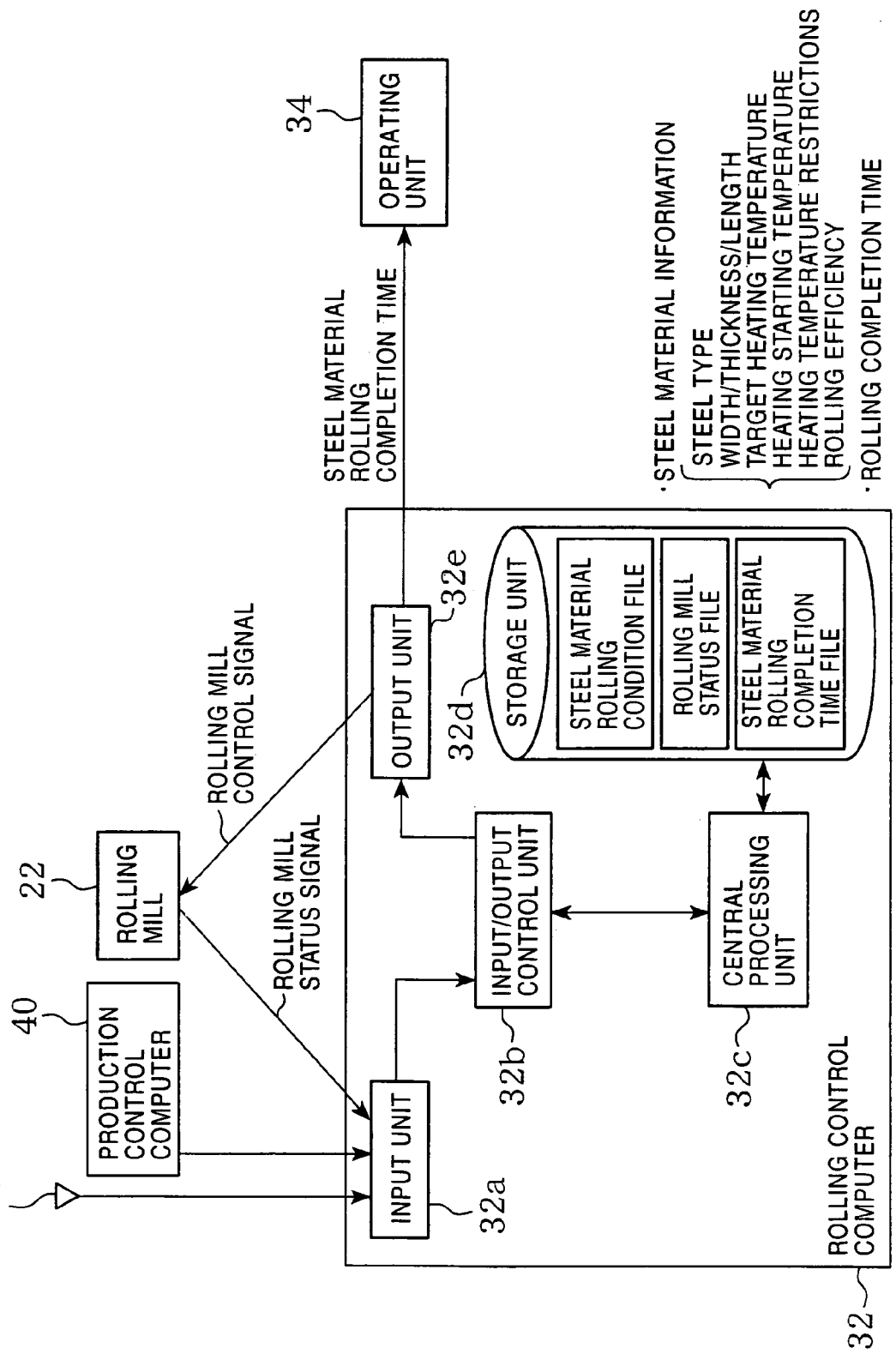
FIG. 8 is a detail of the rolling control computer shown in FIG. 6.

FIG. 8 shows a detail of the rolling control computer 32 to control the rolling mill 22.

The rolling control computer 32 comprises an input unit 32a, an input/output control unit 32b, a central processing unit 32c, a storage unit 32d, and an output unit 32e.

Figure 9:
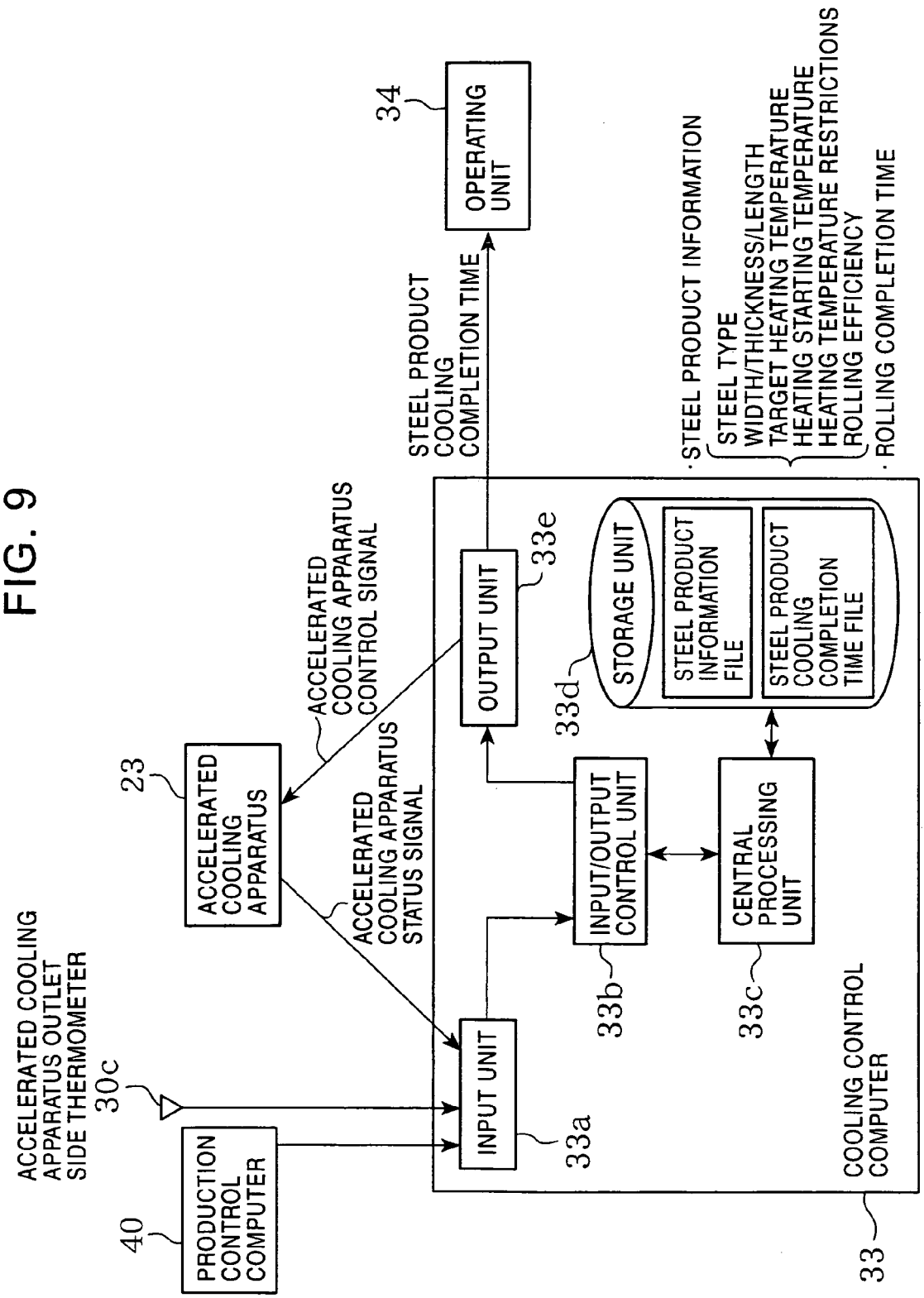
FIG. 9 is a detail of the cooling control computer shown in FIG. 6.

FIG. 9 shows a detail of the cooling control computer 33 to control the cooling apparatus 23.

The cooling control computer 33 comprises an input unit 33a, an input/output control unit 33b, a central processing unit 33c, a storage unit 33d, and an output unit 33e.

Figure 10:
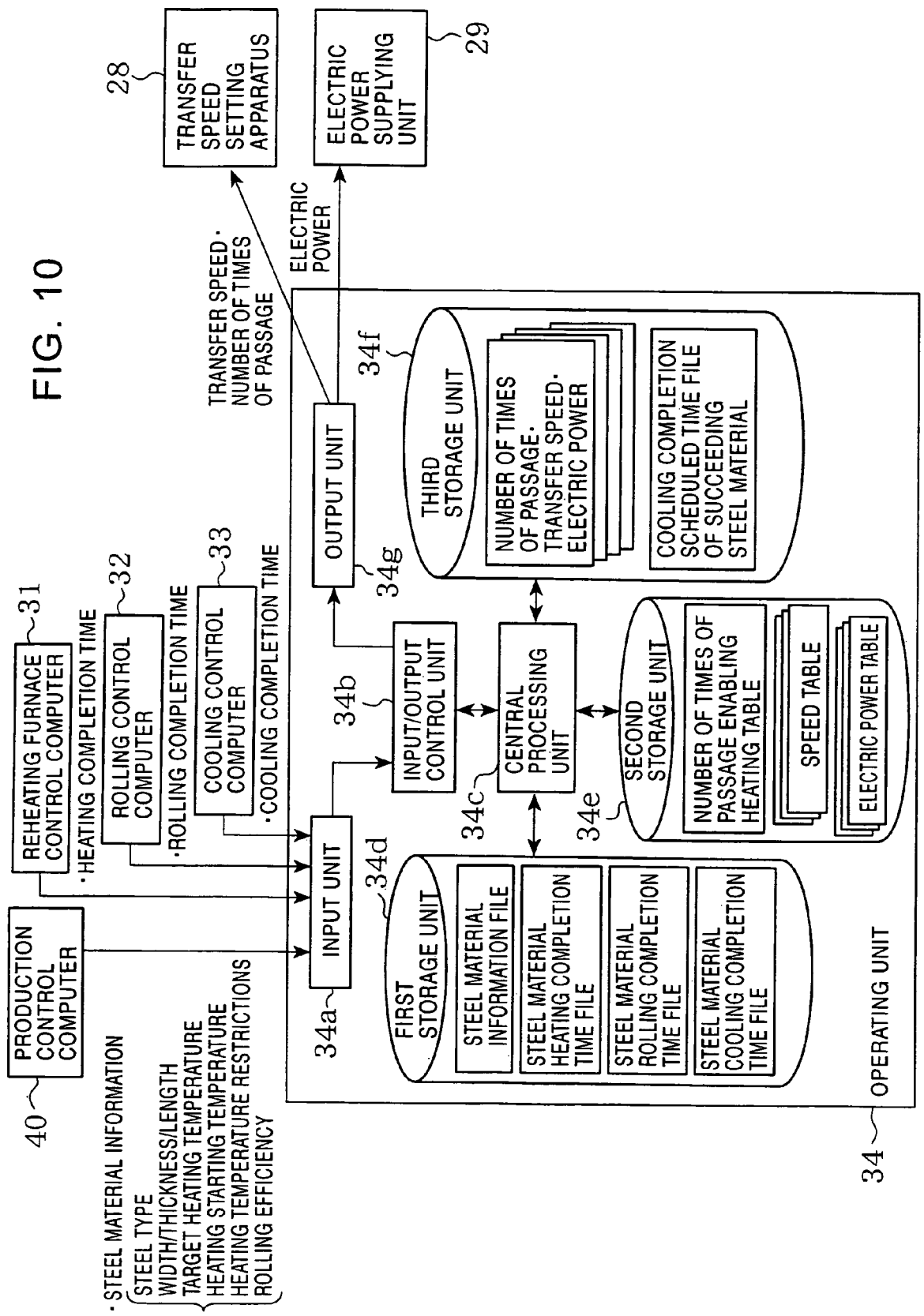
FIG. 10 is a detail of the operating unit shown in FIG. 6.

FIG. 10 shows a detail of the operating unit 34 to control the induction heating equipment 25.

The operating unit 34 comprises an input unit 34a, an input/output control unit 34b, a central processing unit 34c, a first storage unit 34d, a second storage unit 34e, a third storage unit 34f, and an output unit 34g.

First, the reheating furnace control computer 31, the rolling control computer 32, and the cooling control computer 33 receive various information (steel product information) of the steel product 20, which is treated presently or will be treated from now on, transmitted from the production control computer 40, store it into the storage units thereof, and set the operating conditions of the reheating furnace 21, the rolling mill 22, and the cooling apparatus 23, which are preset or calculated, on the basis of dimensions (width, thickness, length) contained in the steel product information, a target reheating temperature, and a steel type, in order to perform the following procedures.

More specifically, the reheating furnace control computer 31 takes a signal output of the reheating furnace outlet side thermometer 30a in the input unit 31a as shown in, for example, FIG. 7, and makes the central processing unit 31c to monitor temperature through the input/output control unit 31b at a constant time period (for example, 100 msec). As an example, whether the steel product 20 has been transferred out of the outlet side of the reheating furnace 21 is judged on the basis of temperature change per unit time. The time, at which the steel product 20 has been transferred out of the outlet side of the reheating furnace 2, is recorded as a heating completion time in the storage unit 31d and transmitted to the operating unit 34 through the output unit 31e. For time, the function of a timer, which is mounted within the reheating furnace control computer 31 to count the present time, may be used, and time input from the production control computer 40, or time input from an outside may be referred to.

The rolling control computer 32 takes a signal output of the rolling mill outlet side thermometer 30b in the input unit 32a as shown in, for example, FIG. 8 and makes the central processing unit 32c to monitor temperature through the input/output control unit 32b at a constant time period (for example, 100 msec). Whether the steel product 20 has been transferred out of the outlet side of the rolling mill 22 is judged on the basis of temperature change per unit time. The rolling control computer 32 also records the time, at which the steel product leaves the rolling mill 22, as a rolling completion time in the storage unit 32d and transmits it to the operating unit 34 through the output unit 32e. Setting of time is carried out by means of the function of an internal timer in the same manner as the reheating furnace control computer 31, or by referring to input from the production control computer 40 or an outside.

The cooling control computer 33 takes a signal output of the cooling apparatus outlet side thermometer 30c in the input unit 33a as shown in, for example, FIG. 9 and makes the central processing unit 33c to monitor temperature through the input/output control unit 33b at a constant time period (for example, 100 msec). Whether the steel product 20 has been transferred out of the outlet side of the cooling apparatus 23 is judged on the basis of temperature change per unit time. Time, at which the steel product 20 leaves the cooling apparatus 23, is recorded as a cooling completion time in the storage unit 33d. Also, the steel product information transmitted from the production control computer 40, the heating completion time transmitted from the reheating furnace control computer 31, and the rolling completion time transmitted from the rolling control computer 32 are input and recorded in the storage unit 33d. Then, the steel product information and the cooling completion time are transmitted to the operating unit 34 through the output unit 33e. The setting of time is carried out by means of the function of an internal timer in the same manner as the reheating furnace control computer 31, or by referring to input from the production control computer 40 or an outside.

Then, the operating unit 34 forwards the steel product information from the production control computer 40, the heating completion time from the reheating furnace control computer 31, the rolling completion time from the rolling control computer 32, and the cooling completion time from the cooling control computer 33, to the central processing unit 34c through the input unit 34a and the input/output control unit 34b to record them in the first storage unit 34d. Also, beforehand recorded in the second storage unit 34e are a table, in which the number of times of passage allowed in the induction heating equipment 25 under a combined condition of dimensions and the temperature rise of the steel product 20 is set, a plurality of corresponding tables, in which the transfer speed of the steel product 20 in the induction heating equipment 25, determined under the combined condition of the dimensions and the temperature rise of the steel product 20 is set, and a plurality of tables, in which the power consumption determined by the dimensions and the temperature rise of the steel product 20 when the number of times of passage and the transfer speed are determined is set. These tables are referred to in determining the number of times of passage, the transfer speed, and the electric power for heating. Also, recorded in the third storage unit 34f are the heat treatment pattern calculated by the operating unit 34 corresponding to the combination of the number of times of passage allowed under conditions of the steel product, the transfer speed, and the electric power, and the scheduled time, at which the cooling of the succeeding steel product is completed. Then, through the operating procedure described later, the operating unit 34 determines the number of times of passage; the transfer speed, and the electric power in the induction heating equipment 25 for the steel product 20, outputs the number of times of passage and the transfer speed to the transfer speed setting apparatus 28 from the output unit 34g through the input/output control unit 34b, and outputs a value of electric power for heating to the electric power supply apparatus 29. Here, the heat treatment pattern means a condition, under which parameters set in the induction heating equipment 25 to subject the steel product to heat treatment in the induction heating equipment 25 in a manner to obtain desired properties are combined together, and the embodiment adopts a combination of the number of times of passage, the transfer speed, and the electric power, while parameters, such as set values, which change the electric power and the transfer speed according to the longitudinal position of the steel product, conditions, under which the number of induction heating equipment as used is changed every time of passage, or the like, having influences on the change in heating temperature of the steel product may be added to constitute a heat treatment pattern.

The operating procedure in the operating unit 34 to determine the heat treatment pattern (combination of the number of times of passage, the transfer speed, and the electric power) will be described below with reference to FIGS. 11 to 14. In the following operations, the number of times of passage serves as a reference parameter to determine various heat treatment patterns, and after the heat treatment patterns are first determined for several numbers of times of passage, the optimum heat treatment parameter such as time, electric power, etc. is selected.

Figure 11:
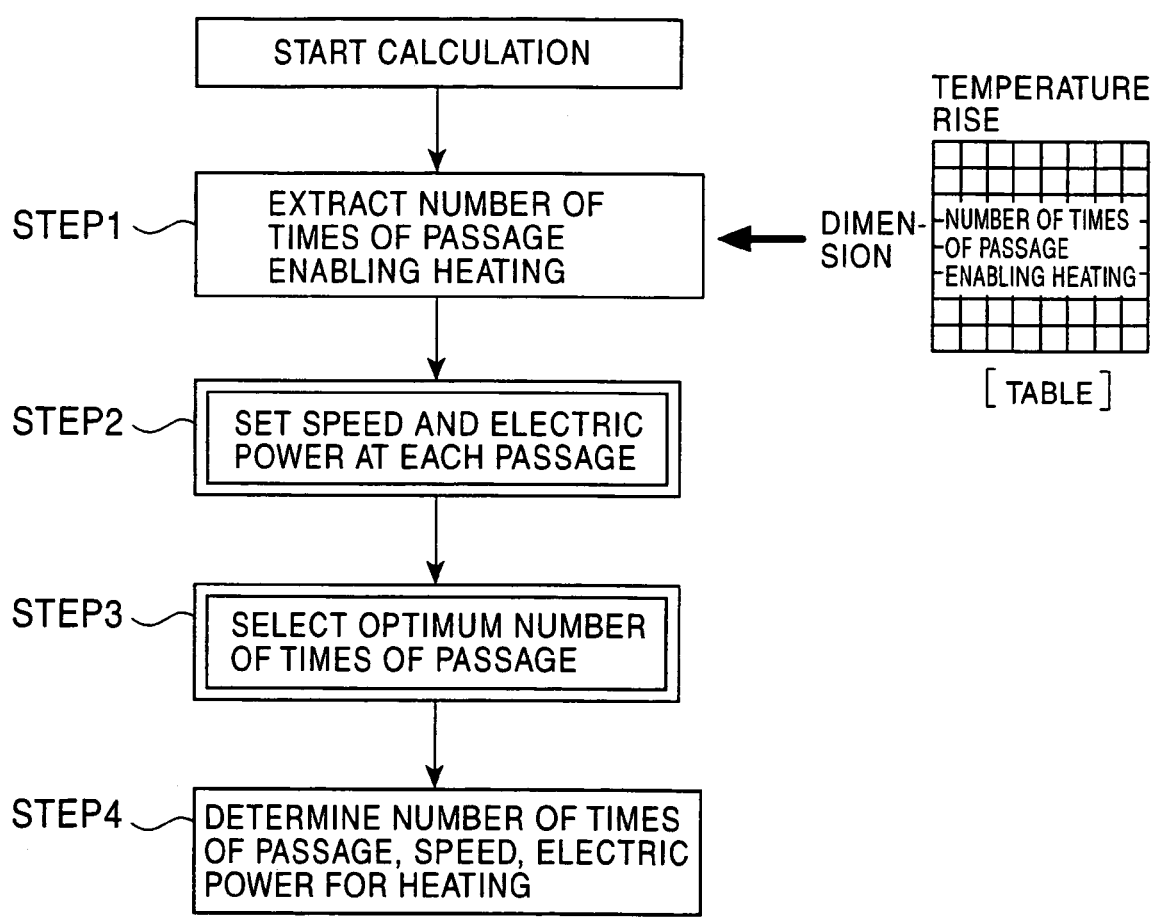
FIG. 11 is a flowchart of operation.

FIG. 11 is a general flowchart of operation.

At a point of time when the operations for the preceding steel product are completed, the operations for the object steel product (a steel product to be subjected to heat treatment subsequent to the steel product being presently subjected to heat treatment) are started and performed in the following Step 1 to Step 4.

Step 1: On the basis of the dimensions and the temperature rise, the number of times of passage (for example, one, three, five) for possible heating is determined as a candidate of the number of times of passage for operations in the next Step with reference to a table of the number of times of passage for possible heating in the second storage unit 34e.

Figure 12:
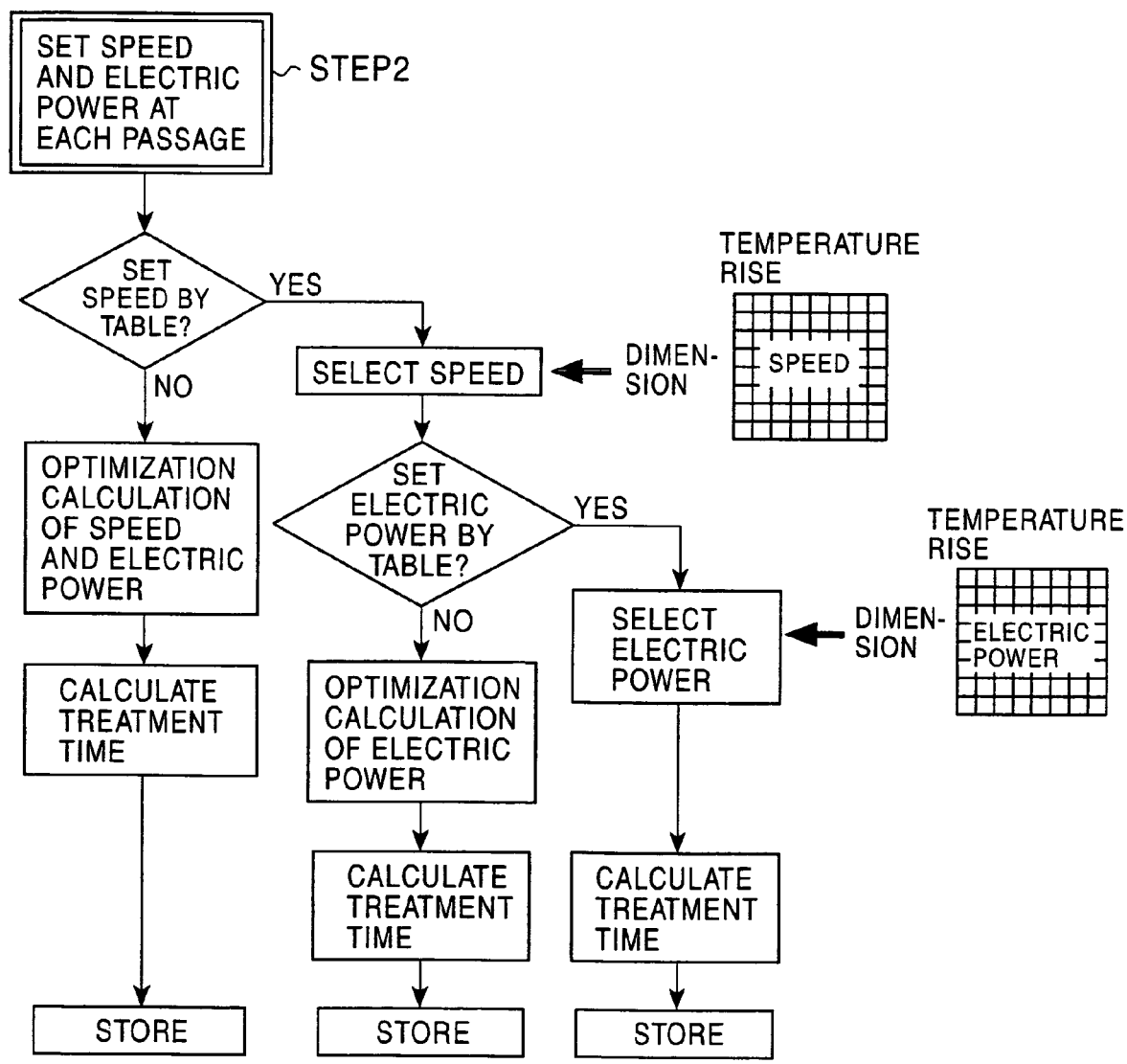
FIG. 12 is a detail of the flowchart of operation.

Step 2: On the basis of the number of times of passages determined in Step 1, the transfer speed and the electric power for heating are calculated corresponding to respective number of times. As shown in FIG. 12, methods of calculating the transfer speed and the electric power for heating include a method of referring to and determining the transfer speed and the electric power for heating on the basis of conditions in a preset table, and a method of calculating the optimal solution in a heating model calculation on the basis of conditions for heat treatment. Accordingly, it is first judged whether the transfer speed is determined by referring to a table, or through the optimization calculation. Usually, the optimization calculation enabling temperature control with high accuracy is selected, while referring to a table is in some cases adopted when the temperature conditions, in which the high accuracy is not needed, are not strict, and when the steel product having composition, which have not been existing, is to be subjected to heat treatment.

In the case where a table is not referred to, the optimization calculation is used to determine the transfer speed and the electric power for heating and the treatment time is calculated.

On the other hand, in case of referring to a table, the transfer speed is calculated by referring to a table stored in the second storage unit 34e, on the basis of the number of times of passage, the dimensions of steel product, and the temperature rise.

Likewise, whether the electric power for heating is determined by referring to a table, or by means of the optimization calculation is judged.

In the case where a table is not referred to, after the optimization calculation is used to calculate the electric power for heating, the electric power for heating is determined by calculating the treatment time.

On the other hand, in case of referring to a table, the electric power for heating is calculated by referring to a table stored in the second storage unit 34e, on the basis of the number of times of passage, the transfer speed, the dimensions of steel product, and the temperature rise.

The operation described above is carried out in the number of times of passage, which is determined as a candidate in Step 1, for example, in the case where the number of times being one, three, and five is determined as a candidate, so that the operation is respectively performed, namely three times in total, and the transfer speed, the electric power for heating, and the treatment time are calculated. Here, the calculated results are stored in the third storage unit 34f.

Figure 13:
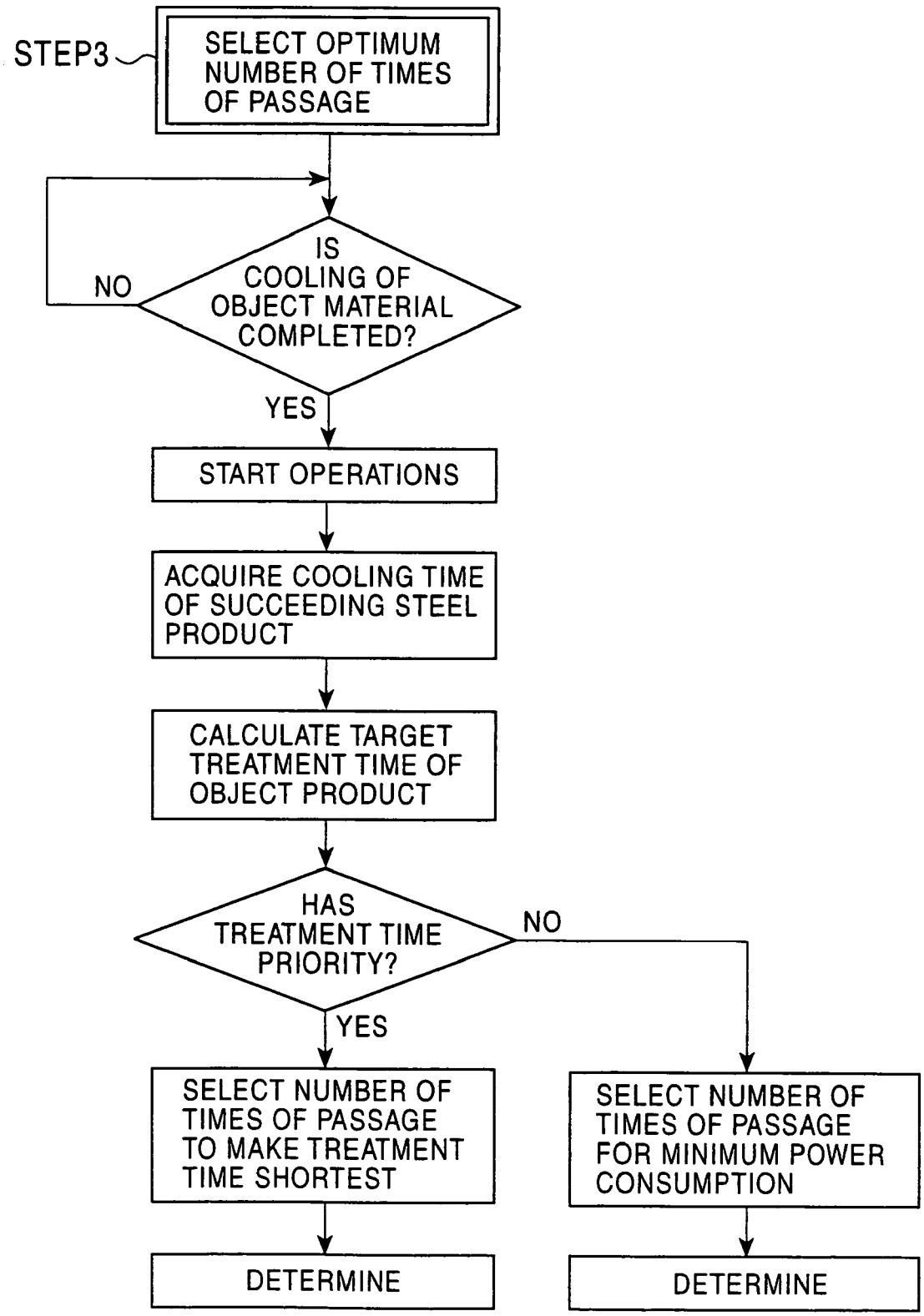
FIG. 13 is a detail of the flowchart of operation.

Step 3: On the basis of the results calculated in Step 2, the optimum number of times of passage is determined. As shown in FIG. 13, the cooling apparatus outlet side thermometer 30c checks whether the cooling of the object steel product is completed. This is because the time is calculated with timing of leaving the cooling apparatus 23 as a reference in order to correctly calculate the time (target treatment time) allowable for heat treatment in the induction heating equipment 25. The target treatment time is usually set to the time, which prevents the succeeding steel product from waiting in processes prior to heat treatment process, or the time making a waiting time of the succeeding steel product shortest when passed the target treatment time. Then, the operation starts when the object steel product leaves the cooling apparatus 23.

First, the target treatment time for the object steel product is calculated by acquiring the scheduled time, at which cooling of the succeeding steel product is completed, and finding a time difference between the scheduled time and the time, at which the cooling of the object steel product is completed. While the target treatment time is here calculated on the basis of time, at which the cooling is completed, it can also be calculated on the basis of time, at which the steel product arrives at the induction heating equipment 25.

Next, it is judged whether the treatment time should have priority. Usually, the shorter treatment time, the less electric power, so that the treatment time has priority and that the number of times of passage, in which the heat treatment time becomes the shortest, is selected. In the case where the treatment time does not have priority, for example, in the case where the succeeding steel product is delayed and the very long target treatment time is allowable, the number of times of passage, in which the electric power for heating becomes minimum, is selected among conditions, under which the heating is completed within the target treatment time.

Step 4: Finally, the transfer speed and the electric power for heating are determined corresponding to the number of times of passage determined in Step 3. That is, the heat treatment pattern of the induction heating equipment 25 is determined thereby.

While the number of times of passage, the transfer speed, and the electric power are calculated from the dimensions and the temperature rise of the steel product in the above Step, the steel type can also be added along with the above.

Figure 14:
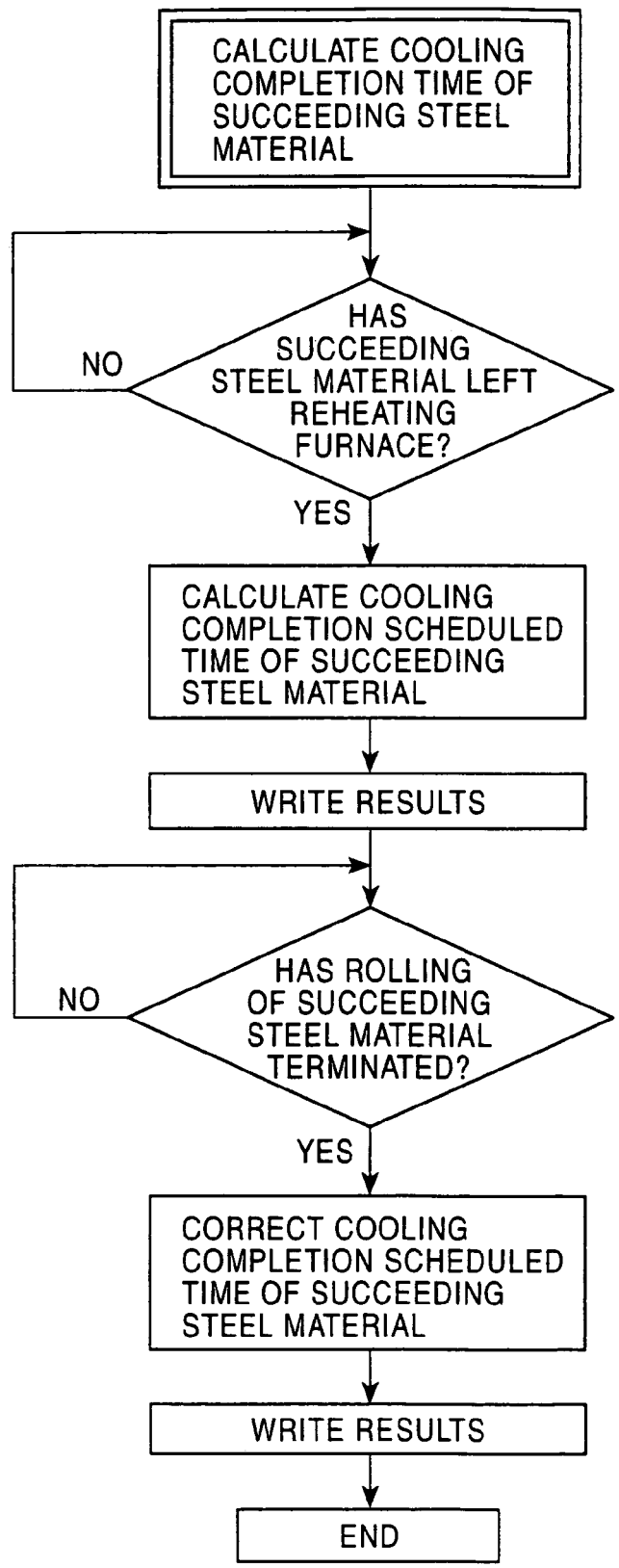
FIG. 14 is a flowchart for calculation of scheduled time, at which the succeeding steel product is cooled.

Subsequently, a method of calculating scheduled time, at which the cooling of the succeeding steel product is completed, described in Step 3 will be explained with reference to FIG. 14.

A location of the steel product 20 is tracked by the respective computers 31 to 33. While the tracking method is carried out by outputs of the heating furnace outlet side thermometer 30a and the rolling mill outlet side thermometer 30b, it is also possible to use a passage detection sensor, which makes use of infrared ray, and to make use of ON/OFF of a load on rolling rolls in a rolling mill and a current load of a motor.

First, the reheating furnace control computer 31 to control the reheating furnace 21 tracks the succeeding steel product to store the time, at which the succeeding steel product leaves the reheating furnace 21, and to transmit such time data to the operating unit 34.

The operating unit 34 calculates the scheduled time, at which the succeeding steel product leaves the cooling apparatus 23, from the transfer speed and the transferring distance on the basis of the input time data. The calculated scheduled time, at which the cooling of the succeeding steel product is completed, is stored in the third storage unit 34f of the operating unit 34.

Further, the rolling control computer 32 to control the rolling mill 22 also tracks the succeeding steel product to store the time, at which the succeeding steel product leaves the rolling mill 22, and transmits the time data to the operating unit 34.

The operating unit 34 again calculates the scheduled time, at which the succeeding steel product leaves the cooling apparatus 23, from the transfer speed and the transferring distance on the basis of the input time data. The calculated scheduled time, at which the cooling of the succeeding steel product is completed, is updated and stored in the third storage unit 34f of the operating unit 34. Thereby, it is possible to more accurately calculate the time, at which the cooling of the succeeding steel product is completed. In this case, while the calculation of scheduled time, at which the cooling is completed, is performed by the operating unit 34, it can be performed by the heating furnace control computer 31, the rolling control computer 32, and the cooling control computer 33, the results of which can be transmitted to the operating unit 34.

The manufacturing method according to the present invention is not only applicable to the case where the uniform temperature distribution of steel plate in the thickness-wise direction is needed but also to the case where the temperature difference is needed in the thickness-wise direction.

EXAMPLE

Steel products were subjected to on-line heat treatment using the manufacturing facilities of steel product shown in FIGS. 1 and 2. Here, the induction heating equipment was composed of three solenoid type induction heating apparatuses arranged in series. Steel products A and B were subjected to accelerated cooling up to 400° C. in the cooling apparatus and steel products C and D were subjected to quenching treatment to 100° C. After cooling, tempering treatment was carried out so that the thickness-wise center of the steel product was heated to 600° C. The upper limit of the surface temperature of steel product was set to 720 t corresponding to the Ac1 transformation point of these steel products.

TABLE 2 indicates heat treatment time when the steel products A to D were subjected to heat treatment with the number of times of passage being one and three.

Here, the transfer speed and the electric energy were measured when the heat treatment was carried out with the number of times of passage being one and three in order to judge which of the number of times of passage should be selected. According to the result of optimization calculation, it is found that the heat treatment time becomes shorter for the steel products A and C with the number of times of passage being one and for the steel products B and D with the number of times of passage being three.

While the tempering treatment was carried out so that the thickness-wise center of steel product was heated to a predetermined temperature in this example, it is possible to use the temperature of an arbitrary position of steel product as a temperature control.

TABLE 2

|  |  | A | B | C | D |
|---|---|---|---|---|---|
| DIMENSIONS OF STEEL MATERIAL (THICKNESS × WIDTH mm) | | 15 × 3500 | 25 × 3500 | 15 × 3500 | 25 × 3500 |
| TEMPERATURE BEFORE HEATING (° C.) | | 400 | 400 | 100 | 100 |
| HEAT TREATMENT TEMPERATURE (° C.) | | 600 | 600 | 600 | 600 |
| TEMPERATURE RISE (° C.) | | 200 | 200 | 500 | 500 |
| TRANSFER SPEED WHEN THE NUMBER OF TIMES OF PASSAGE IS ONE (m/s) | | 0.33 | 0.17 | 0.17 | 0.08 |
| ELECTRIC POWER WHEN THE NUMBER OF TIMES OF PASSAGE IS ONE (kWh) | | 15.7 | 28.2 | 33.7 | 58.7 |
| HEAT TREATMENT TIME WHEN THE NUMBER OF TIMES OF PASSAGE IS ONE (s) | | 186.0 | 324.0 | 366.0 | 642.0 |
| TRANSFER SPEED WHEN THE NUMBER OF TIMES OF PASSAGE IS THREE (m/s) | FIRST TIME | 0.67 | 0.33 | 0.33 | 0.17 |
| | SECOND TIME | 1.17 | 0.83 | 0.67 | 0.5 |
| | THIRD TIME | 1.0 | 0.67 | 0.5 | 0.33 |
| ELECTRIC POWER WHEN THE NUMBER OF TIMES OF PASSAGE IS THREE (kWh) | | 22.8 | 38.4 | 40.4 | 71.0 |
| HEAT TREATMENT TIME WHEN THE NUMBER OF TIMES OF PASSAGE IS THREE (s) | | 207.4 | 308.1 | 396.0 | 589.0 |

The invention claimed is:

1. A method of manufacturing a steel product comprising heat treating a steel product which has been subjected to quenching or accelerated cooling on a hot rolling line after hot rolling by passing the steel product at least once through a plurality of induction heating apparatuses, which are installed on the hot rolling line, wherein a number of times of passage of the steel product through the induction heating apparatuses is such that a heat treatment time becomes the shortest, the heat treatment time being determined from the number of times of passage, a transfer speed of the steel product and an amount of electric power for the induction heating apparatuses, and the heat treatment time being the time in which a surface temperature of the steel product and a thickness-wise center temperature of the steel product fall within a predetermined range, wherein a peak value of the surface temperature of the steel product is controlled so that the surface temperature does not exceed a maximum value of a predetermined temperature range, and wherein conditions in which the heat treatment time becomes the shortest are determined by the following steps:
(a) determining the dimensions of the steel product and a necessary temperature rise of the steel product to be subjected to the heat treating,
(b) determining the transfer speed and the amount of electric power for the induction heating apparatuses when the number of times of passage is one based on the dimensions and the necessary temperature rise of the steel product determined in step (a),
(c) determining the transfer speed and the amount of electric power for the induction heating apparatuses when the number of times of passage is not less than two based on the dimensions and the necessary temperature rise of the steel product determined in step (a),
(d) selecting a number of times of passage in which the heat treatment time becomes the shortest based on heat treatment times when the number of times of passage is one in step (b) and when the number of times of passage is not less than two in step (c), and
(e) determining the transfer speed and the amount of electric power for the induction heating apparatuses for each passage of the number of times of passage selected in step (d).

2. The method of manufacturing a steel product according to claim 1, wherein when the heat treating is carried out when the number of times of passage is three or more, a transfer speed of the steel product is changed every time of passage through the induction heating apparatuses.

3. The method of manufacturing a steel product according to claim 1, wherein when the heat treating is carried out with the number of times of passage being n which is equal to or more than three, transfer speeds of the steel product at a nth passage and at a (n-1)th passage are larger than those at a (n-2)th passage or before.

4. The method of manufacturing a steel product according to claim 1, wherein the method for determining the transfer speed of the steel product and the amount of electric power for the induction heating apparatuses at each of the number of times of passage in the steps (b) and (c) comprises solving an optimization problem at every time of passage, in which the variables include the transfer speed of the steel product and the amount of the electric power for each induction heating apparatus, constraint conditions include the surface temperature of the steel product and the center temperature of the steel product are within a predetermined range of temperatures, and an objective function includes the heat treatment time and/or the amount of consumed electricity.

5. The method of manufacturing a steel product according to claim 4, wherein the optimization problem in the steps (b) and (c) is solved beforehand and wherein at least one of the transfer speed at every time of passage according to the dimensions of the steel product is stored in a table and the amount of electric power of each induction heating apparatus is stored in a table.

6. The method of manufacturing a steel product according to claim 1, wherein passing the steel product at least once through the plurality of induction heating apparatuses comprises passing the steel product continuously through the plurality of induction heating apparatuses within each pass without stopping the steel product.

7. The method of manufacturing a steel product according to claim 1, further comprising the step of determining a possible number of times of passage for the steel product based on the dimensions and the necessary temperature rise of the steel product determined in step (a).

8. The method of manufacturing a steel product according to claim 1, further comprising the steps of:
determining a target treatment time based on the time when cooling of the steel product is completed or when it arrives at the induction heating apparatuses and the time when cooling of a succeeding steel product will be completed, and
selecting the number of times of passage in which the heat treatment time becomes the shortest or the number of times of passage in which electric power for heating becomes minimum based on the target treatment time.

9. A method of manufacturing a steel product comprising heat treating a steel product which has been subjected to quenching or accelerated cooling on a hot rolling line after hot rolling by passing the steel product at least once through a plurality of induction heating apparatuses, which are installed on the hot rolling line,
wherein a number of times of passage of the steel product through the induction heating apparatuses is such that a heat treatment time falls within a target treatment time, the heat treatment time being determined based on the number of times of passage, a transfer speed of the steel product and an amount of electric power for the induction heating apparatuses, and the heat treatment time being the time in which a surface temperature of the steel product and a thickness-wise center temperature of the steel product fall within a predetermined temperature range,
wherein a peak value of the surface temperature of the steel product is controlled so that the surface temperature does not exceed a maximum value of a predetermined temperature range,
and wherein conditions in which the heat treatment time falls within the target treatment time are determined by the following steps:
(a) determining the dimensions of the steel product and a necessary temperature rise of the steel product to be subjected to the heat treating,
(b) determining the transfer speed and the amount of electric power for the induction heating apparatuses when the number of times of passage is one based on the dimensions and the necessary temperature rise of the steel product determined in step (a),
(c) determining the transfer speed and the amount of electric power for the induction heating apparatuses when the number of times of passage is not less than two based on the dimensions and the necessary temperature rise of the steel product determined in step (a),
(d) selecting a number of times of passage in which the heat treatment time falls within the target treatment time based on the heat treatment times when the number of times of passage is one in step (b) and when the number of times of passage is not less than two in step (c), and
(e) determining the transfer speed and the amount of electric power for the induction heating apparatuses for each passage of the number of times of passage selected in step (d).

10. The method of manufacturing a steel product according to claim 9, wherein the target treatment time is set to a time which prevents a succeeding steel product from waiting in processes prior to the heat treating, or a time which results in a waiting time of a succeeding steel product being the shortest when the target treatment time has passed.

11. The method of manufacturing a steel product according to claim 10, wherein the target treatment time is calculated on the basis of a time at which cooling of a succeeding steel product is completed, or on the basis of the time at which the succeeding steel product arrives at the induction heating apparatuses.

12. The method of manufacturing a steel product according to claim 10, wherein the number of times of passage through the induction heating apparatuses is a number which results in a minimum electric power consumption, among such numbers of times the heat treatment time falls within the target treatment time.

13. The method of manufacturing a steel product according to claim 9, wherein the method for determining the transfer speed of the steel product and the amount of electric power for the induction heating apparatuses at each of the number of times of passage in the steps (b) and (c) comprise solving an optimization problem at every time of passage in which variables include the transfer speed of the steel product and the amount of electric power for each induction heating apparatus, constraint conditions include the surface temperature of the steel product and the center temperature of the steel product are within a predetermined range of temperatures, and an objective function includes the heat treatment time and/or the amount of consumed electricity.

14. The method of manufacturing a steel product according to claim 13, wherein the optimization problem in the steps (b) and (c) is solved beforehand and wherein at least one of the transfer speed at every time of passage according to the dimensions of the steel product is stored in a table and the amount of electric power of each induction heating apparatus is stored in a table.

15. A method of manufacturing a steel product comprising heat treating a steel product which has been subjected to quenching or accelerated cooling on a hot rolling line after hot rolling by passing the steel product at least once through a plurality of induction heating apparatuses, which are installed on the hot rolling line, and a surface temperature of the steel product and a temperature in a predetermined position inside the steel product are each determined as a variable based on the number of times of passage, a transfer speed of the steel product and an amount of electric power for the induction heating apparatuses, wherein the steel product is subjected to the heat treating so that a heat treatment time falls within a target treatment time, the heat treatment time being the time in which the surface temperature of the steel product does not exceed a predetermined upper limit temperature and the temperature in a predetermined position inside the steel product reaches a target temperature, wherein a peak value of the surface temperature of the steel product is controlled so that the surface temperature does not exceed a maximum value of a predetermined temperature range, and wherein conditions in which the heat treatment time falls within the target treatment time are determined by the following steps:

(a) determining the dimensions of the steel product and a necessary temperature rise of the steel product to be subjected to the heat treating, (b) determining the transfer speed and the amount of electric power for the induction heating apparatuses when the number of times of passage is one based on the dimensions and the necessary temperature rise of the steel product determined in step (a), (c) determining the transfer speed and the amount of electric power for the induction heating apparatuses when the number of times of passage is not less than two based on the dimensions and the necessary temperature rise of the steel product determined in step (a), (d) selecting a number of times of passage in which the heat treatment time falls within the target treatment time based on the heat treatment times when the number of times of passage is one in step (b) and when the number of times of passage is not less than two in step (c), and (e) determining the transfer speed and the amount of electric power for the induction heating apparatuses for each passage of the number of times of passage selected in step (d).

16. The method of manufacturing a steel product according to claim 15, wherein the target treatment time is set to a time which prevents a succeeding steel product from waiting in processes prior to the heat treating, or a time which results in a waiting time of a succeeding steel product being the shortest when the target treatment time has passed.

17. The method of manufacturing a steel product according to claim 16, wherein heating of the steel product is completed within the target treatment time and performed so that power consumption is at a minimum.

18. The method of manufacturing a steel product according to claim 16, wherein when the heat treating is carried out when the number of times of passage is three or more, and a transfer speed of the steel product at a last time of passage is larger than that at a first time of passage.

19. The method of manufacturing a steel product according to claim 15, wherein the method for determining the transfer speed of the steel product and the amount of electric power for the induction heating apparatuses at each of the number of times of passage in the steps (b) and (c) comprise solving an optimization problem at every time of passage in which variables include the transfer speed of the steel product and the amount of the electric power for each induction heating apparatus, constraint conditions include the surface temperature of the steel product and the center temperature of the steel product are within a predetermined range of temperatures, and an objective function includes the heat treatment time and/or the amount of consumed electricity.

20. The method of manufacturing a steel product according to claim 19, wherein the optimization problem in the steps (b) and (c) is solved beforehand and wherein at least one of the transfer speed at every time of passage according to the dimensions of the steel product is stored in a table and the amount of electric power of each induction heating apparatus is stored in a table.

21. A method of manufacturing a steel product comprising heat treating a steel product which has been subjected to quenching or accelerated cooling on a hot rolling line after hot rolling by passing the steel product at least once through a plurality of induction heating apparatuses, which are installed on the hot rolling line, a surface temperature of the steel product and a temperature in a predetermined position inside the steel product are each determined as a variable based on the number of times of passage, a transfer speed of the steel product and an amount of electric power for the induction heating apparatuses, wherein the steel product is subjected to the heat treating so that a heat treatment time becomes the shortest, the heat treatment time being the time in which the surface temperature of the steel product does not exceed a predetermined upper limit temperature and the temperature in a predetermined position inside the steel product reaches a target temperature, wherein a peak value of the surface temperature of the steel product is controlled so that the surface temperature does not exceed a maximum value of a predetermined temperature range, and wherein conditions in which the heat treatment time becomes the shortest are determined by the following steps:

(a) determining the dimension of the steel product and a necessary temperature rise of the steel product to be subjected to heat treating, (b) determining the transfer speed and the amount of electric power for the induction heating apparatus when the number of times of passage is one based on the dimensions and the necessary temperature rise of the steel product determined in step (a), (c) determining the transfer speed and the amount of electric power for the induction heating apparatuses when the number of times of passage is not less than two based on the dimensions and the necessary temperature rise of the steel product determined in step (a), (d) selecting a number of times of passage in which the heat treatment time becomes the shortest based on the heat treatment times when the number of times of passage is one in step (b) and when the number of times of passage is not less than two in step (c), and (e) determining the transfer speed and the amount of electric power for the induction heating apparatuses for each passage of the number of times of passage selected in step (d).

22. The method of manufacturing a steel product according to claim 21, wherein when the heat treating is carried out when the number of times of passage is three or more, and the transfer speed of the steel product at a last time of passage is larger than that at a first time of passage.

23. The method of manufacturing a steel product according to claim 21, wherein the method for determining the transfer speed of the steel product and the amount of electric power for the induction heating apparatuses at each of the number of times of passage in the steps (b) and (c) comprise solving an optimization problem at every time of passage in which variables include the transfer speed of the steel product and the amount of the electric power for each induction heating apparatus, constraint conditions include the surface temperature of the steel product and the center temperature of the steel product being within a predetermined range of temperatures, and an objective function includes the heat treatment time and/or the amount of consumed electricity.

24. The method of manufacturing a steel product according to claim 23, wherein the optimization problem in the steps (b) and (c) is solved beforehand and wherein at least one of the transfer speed at every time of passage according to the dimensions of the steel product is stored in a table and the amount of electric power of each induction heating apparatus is stored in a table.

25. A method of manufacturing a steel product comprising heat treating a steel product which has been subjected to quenching or accelerated cooling on a hot rolling line after hot rolling by passing the steel product at least once through a plurality of induction heating apparatuses, which are installed on the hot rolling line, wherein a number of times of passage of the steel product through the induction heating apparatuses is such that a heat treatment time becomes the shortest or falls within a target treatment time, the heat treatment time being determined from the number of times of passage, a transfer speed of the steel product and an amount of electric power for the induction heating apparatuses, wherein the heat treatment time is determined by the following steps:

(a) determining the dimensions of the steel product and a necessary temperature rise of the steel product to be subjected to the heat treating, (b) determining the transfer speed and the amount of electric power for the induction heating apparatuses when the number of times of passage is one based on the dimensions and the necessary temperature rise of the steel product determined in step (a), (c) determining the transfer speed and the amount of electric power for the induction heating apparatuses when the number of times of passage is not less than two based on the dimensions and the necessary temperature rise of the steel product determined in step (a), (d) determining a target treatment time based on the time when cooling of the steel product is completed or when it arrives at the induction heating apparatuses and the time when cooling of a succeeding steel product will be completed, (e) selecting the number of times of passage in which the heat treatment time becomes the shortest or the number of times of passage in which electric power for heating becomes minimum based on the target treatment time determined in step (d), and (f) determining the transfer speed and the amount of electric power for the induction heating apparatuses for each passage of the number of times of passage selected in step (e).

* * * * *